US010007030B2

(12) United States Patent
Asahi et al.

(10) Patent No.: US 10,007,030 B2
(45) Date of Patent: *Jun. 26, 2018

(54) ANTIREFLECTIVE FILM, POLARIZING PLATE, COVER GLASS, IMAGE DISPLAY DEVICE, METHOD FOR PRODUCING ANTIREFLECTIVE FILM, CLOTH FOR CLEANING ANTIREFLECTIVE FILM, KIT INCLUDING ANTIREFLECTIVE FILM AND CLEANING CLOTH, AND METHOD FOR CLEANING ANTIREFLECTIVE FILM

(71) Applicant: FUJIFILM Corporation, Tokyo (JP)

(72) Inventors: Miho Asahi, Kanagawa (JP); Takayasu Yamazaki, Kanagawa (JP); Kenichi Fukuda, Kanagawa (JP); Shuntaro Ibuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 290 days.

This patent is subject to a terminal disclaimer.

(21) Appl. No.: 14/940,265

(22) Filed: Nov. 13, 2015

(65) Prior Publication Data

US 2016/0077240 A1    Mar. 17, 2016

Related U.S. Application Data

(63) Continuation of application No. PCT/JP2014/062276, filed on May 7, 2014.

(30) Foreign Application Priority Data

May 13, 2013   (JP) .................................. 2013-101137
Mar. 31, 2014  (JP) .................................. 2014-074629

(51) Int. Cl.
| | | |
|---|---|---|
| B32B 27/00 | (2006.01) |
| G02B 1/118 | (2015.01) |
| B32B 7/02 | (2006.01) |
| G02B 5/30 | (2006.01) |
| G02B 1/111 | (2015.01) |
| G02B 27/00 | (2006.01) |
| G02B 5/02 | (2006.01) |
| G02B 1/14 | (2015.01) |

(52) U.S. Cl.
CPC .............. *G02B 1/118* (2013.01); *B32B 7/02* (2013.01); *G02B 1/111* (2013.01); *G02B 5/0294* (2013.01); *G02B 5/3025* (2013.01); *G02B 27/0006* (2013.01); *G02B 1/14* (2015.01)

(58) Field of Classification Search
CPC ...................................................... G02B 1/118
USPC .............................. 428/421, 312.8, 331, 323
See application file for complete search history.

(56) References Cited

U.S. PATENT DOCUMENTS

| | | | |
|---|---|---|---|
| 2010/0246014 A1 | 9/2010 | Asahi et al. | |
| 2011/0128629 A1 | 6/2011 | Takahashi et al. | |
| 2015/0253466 A1* | 9/2015 | Ibuki ...................... | G02B 1/118 |
| | | | 359/488.01 |
| 2016/0061997 A1* | 3/2016 | Kamohara ............. | G02B 1/118 |
| | | | 428/323 |
| 2016/0077239 A1* | 3/2016 | Asahi ..................... | G02B 1/118 |
| | | | 359/492.01 |

FOREIGN PATENT DOCUMENTS

| | | |
|---|---|---|
| JP | H07-272646 A | 10/1995 |
| JP | H09-178903 A | 7/1997 |
| JP | 2005-250309 A | 9/2005 |
| JP | 2005-307379 A | 11/2005 |
| JP | 2006-225513 A | 8/2006 |
| JP | 2009-139796 A | 6/2009 |
| JP | 2010-082860 A | 4/2010 |
| JP | 2010-164824 A | 7/2010 |
| JP | 2010-256880 A | 11/2010 |
| JP | 2011-076072 A | 4/2011 |
| JP | 2012-145748 A | 8/2012 |
| JP | 2013-068921 A | 4/2013 |

OTHER PUBLICATIONS

International Search Report dated Jun. 17, 2014 in connection with Application No. PCT/JP2014/062276.
Written Opinion dated Jun. 17, 2014 in connection with Application No. PCT/JP2014/062276.
Notification of Reasons for Refusal issued by the Japanese Patent Office dated Oct. 11, 2016, in connection with Japanese Patent Application No. 2014-074629.
Translation of Written Opinion dated Jun. 17, 2014 in connection with Application No. PCT/JP2014/062276.

(Continued)

*Primary Examiner* — Terressa Boykin
(74) *Attorney, Agent, or Firm* — Edwards Neils LLC; Jean C. Edwards, Esq.

(57) ABSTRACT

The invention is to provide a antireflective film having a moth-eye structure, which has sufficient antireflective performances, which exhibits excellent planar uniformity, and which can be manufactured by a simple method; a polarizing plate, a cover glass, and an image display device that have the antireflective film; a method for producing the antireflective film; a cloth for cleaning the antireflective film; a kit including the antireflective film and the cleaning cloth; and a method for cleaning the antireflective film. The invention provides a antireflective film which includes a plastic substrate; a infiltration layer; a antireflective layer including a binder resin and particles with an average primary particle diameter of 50 nm to 700 nm, in this order in an adjacent manner, in which the antireflective layer has moth-eye structures formed by the particles on the surface opposite to the infiltration layer.

27 Claims, 1 Drawing Sheet

(56) References Cited

OTHER PUBLICATIONS

Notification of Reasons for Refusal issued by the Japanese Patent Office dated Jul. 4, 2017, in connection with Japanese Patent Application No. 2014-074629.

* cited by examiner

ANTIREFLECTIVE FILM, POLARIZING PLATE, COVER GLASS, IMAGE DISPLAY DEVICE, METHOD FOR PRODUCING ANTIREFLECTIVE FILM, CLOTH FOR CLEANING ANTIREFLECTIVE FILM, KIT INCLUDING ANTIREFLECTIVE FILM AND CLEANING CLOTH, AND METHOD FOR CLEANING ANTIREFLECTIVE FILM

CROSS REFERENCE TO RELATED APPLICATION

This is a continuation of International Application No. PCT/JP2014/062276 filed on May 7, 2014, which was published under PCT Article 21(2) in Japanese, and claims priority from Japanese Patent Application Nos. 2013-101137 filed on May 13, 2013 and 2014-074629 filed on Mar. 31, 2014, the entire disclosures of which are incorporated herein by reference in their entirety.

BACKGROUND OF THE INVENTION

1. Field of the Invention

The present invention relates to an antireflective film, a polarizing plate, a cover glass, an image display device, a method for producing an antireflective film, a cloth for cleaning an antireflective film, a kit including the antireflective film and a cleaning cloth, and a method for cleaning an antireflective film.

2. Description of the Related Art

In an image display device such as a cathode ray tube display device (CRT), a plasma display (PDP), an electroluminescent display (ELD), a vacuum fluorescent display (VFD), a field-emission display (FED), and a liquid crystal display device (LCD), an antireflective film may be provided in order to prevent a decrease in contrast or a reflected glare of an image due to reflection of external light on a display surface.

As the antireflective film, an antireflective film has been known, which includes, on a substrate surface, a fine unevenness shape of which a period is shorter than the wavelength of the visible light, that is, an antireflective layer having a so-called moth-eye structure. By the moth-eye structure, a refractive index gradient layer whose refractive index is varied continuously from the air towards a bulk material inside the substrate is artificially produced, so that reflection of light may be prevented.

As the antireflective film having the moth-eye structure, JP2009-139796A discloses an antireflective film having a moth-eye structure which is manufactured by coating a transparent substrate with a coating liquid containing a transparent resin monomer and microstructured particles, curing the coating liquid to form a transparent resin in which microstructured particles are dispersed, and then etching the transparent resin.

SUMMARY OF THE INVENTION

However, in the technique of JP2009-139796A, the transparent resin has to be etched, such that a process for producing the antireflective film becomes complicated.

Therefore, the present inventors have reviewed the manufacturing of a moth-eye structure without performing etching.

When a film having the moth-eye structure was desired to be provided only by coating a substrate with a coating liquid including particles and a binder and performing curing, the present inventors found that there were problems in that:

(1) When a content ratio of the particles is high and a content ratio of the binder is low before the coating, the particles aggregate with each other until completion of a film, and, a uniform film was not formed; and (2) When a content ratio of the particles is low and a content ratio of the binder is high after the coating, the particles were embedded in the binder and an unevenness structure was not able to be formed, thereby, sufficient antireflective performances were not exhibited. Also, the particles excessively aggregate with each other, an aggregated portion functions as a large scattering body. Therefore, the film becomes white turbidity, and haze occurs. As a result, contrast is deteriorated, and thus beautiful black tightness of a display due to the antireflective film is impaired.

That is, the object of the invention is to provide a antireflective film having a moth-eye structure, which has sufficient antireflective performances, exhibits excellent planar uniformity, and can be manufactured by a simple method. In addition, another object of the invention is to provide a polarizing plate, a cover glass, and an image display device which include an antireflective film.

Further, the antireflective film having the moth-eye structure has a theoretical problem with respect to the attachment of a substance (hereinafter dirt) in that, if there is a substance having a refractive index different from that of the air in the unevenness structure, reflectance increases only in that portion, and visibility is excessively harmed. Accordingly, still another object of the invention is to provide durability against dirt by making it difficult for dirt to be attached to the antireflective film having the moth-eye structure. Accordingly, still another aspect of the invention is to provide a cloth for cleaning antireflective film, a kit including the antireflective film and a cleaning cloth, and a method for cleaning an antireflective film.

In order to solve the above problem, the present inventors diligently performed examination and found out that, particles did not aggregate with each other when a content ratio of particles was low in a coating liquid, and only a portion of a binder infiltrated a substrate when the substrate is coated with the coating liquid, thereby a content ratio of the binder in the film decreased. Then, an unevenness structure was formed by particles when a film was completed, and thus a moth-eye structure which had low reflection and excellent uniformity of a surface was able to be easily produced.

In addition, the present inventors found that a contact angle of water was remarkably increased by manufacturing a moth-eye structure having a specific antifouling agent on the surface, and an antireflective film having excellent water- and oil-repellent was able to be manufactured, and also found that dirt attached to a surface of the antireflective layer having the moth-eye structure was able to be easily removed by using an ultra fine fiber cloth having specific sizes of hollows or voids and a specific contact angle.

That is, the above problems are solved by the following configurations.

[1] An antireflective film including: a plastic substrate; a permeable layer; and a antireflective layer including a binder resin and particles with an average primary particle diameter in the range of 50 nm to 700 nm, wherein the plastic substrate, the infiltration layer, and the antireflective layer are adjacent to each other in this order, and the antireflective layer has a moth-eye structure formed by the particles on a surface opposite to the infiltration layer.

[2] The antireflective film according to [1], in which integrated reflectance over an entire range of wavelengths from 380 nm to 780 nm is 3% or less.

[3] The antireflective film according to [1] or [2], in which the binder resin includes a resin that is obtained by curing a compound having a (meth)acryloyl group with a molecular weight of 150 to 1,600.

[4] The antireflective film according to [1] to [3], in which the binder resin includes a resin obtained by curing a compound having a (meth)acryloyl group and having a SP value in a range of 20 to 25.

[5] The antireflective film according to any one of [1] to [4], in which the particles are metal oxide particles.

[6] The antireflective film according to any one of [1] to [5], in which the particles are silica particles.

[7] The antireflective film according to any one of [1] to [6], in which the particles are particles subjected to a treatment with a compound having an unsaturated double bond on a surface.

[8] The antireflective film according to any one of [1] to [7], in which the antireflective layer has a film thickness of 0.1 μm to 5 μm.

[9] The antireflective film according to any one of [1] to [8], in which the infiltration layer has a film thickness of 0.1 μm to 5 μm.

[10] The antireflective film according to any one of [1] to [9], in which the antireflective layer contains a dispersing agent.

[11] The antireflective film according to any one of [1] to [10], in which the infiltration layer contains a solvent having infiltration property with respect to the plastic substrate.

[12] The antireflective film according to any one of [1] to [11], in which the plastic substrate contains cellulose acylate.

[13] The antireflective film according to any one of [1] to [12], in which a haze value is 5% or less.

[14] The antireflective film according to any one of [1] to [13], in which a contact angle of water is 100° or more.

[15] The antireflective film according to any one of [1] to [14], in which the antireflective layer contains a fluorine-containing compound or a silicone compound in a range of 2% by mass or less with respect to an entire amount of the antireflective layer.

[16] The antireflective film according to [15], in which the fluorine-containing compound or the silicone compound has a polymerizable group in a molecule.

[17] The antireflective film according to [15] or [16], in which the fluorine-containing compound has a polyether compound in a molecule.

[18] The antireflective film according to [15] or [16], in which the silicone compound has a polydimethyl siloxane unit with a molecular weight of 1,000 or more.

[19] The antireflective film according to any one of [15] to [18], further including the fluorine-containing compound or the silicone compound, in which a contact angle of water is 110° or more, and a contact angle of an oleic acid is 80° or more.

[20] The antireflective film according to any one of [1] to [19], further including: only monodispersed silica microstructured particles with an average primary particle diameter in the range of the particle of 50 nm to 200 nm, and a Cv value of less than 5%.

[21] A polarizing plate including the antireflective film according to any one of [1] to [20] as a polarizing plate protective film.

[22] A cover glass including the antireflective film according to any one of [1] to [20] as a protective film.

[23] An image display device including the antireflective film according to any one of [1] to [20] or the polarizing plate according to [21].

[24] A method for producing an antireflective film that includes a plastic substrate, an infiltration layer, and an antireflective layer including a binder resin and particles with an average primary particle diameter of 50 nm to 700 nm, in which the plastic substrate, the infiltration layer, and the antireflective layer are adjacent to each other in this order, and the antireflective layer has a moth-eye structure formed by the particles on a surface opposite to the infiltration layer, the method including: coating the plastic substrate with a composition including particles with an average primary particle diameter of 50 nm to 700 nm, a polymerizable compound for forming a binder resin, and a solvent having infiltration property into the plastic substrate; causing the solvent having infiltration property into the plastic substrate and a portion of the polymerizable compound for forming the binder resin to infiltrate the plastic substrate; curing the polymerizable compound for forming the binder resin by ionization radiation irradiation or heating after an organic solvent is dried; and forming the infiltration layer and the antireflective layer having the moth-eye structure formed by the particles on the surface opposite to the infiltration layer.

[25] A cleaning cloth for removing dirt attached to the antireflective film according to any one of [1] to [20], in which hollows or voids with distance smaller than an average primary particle diameter of particles of the antireflective film according to any one of [1] to [20] are formed, and a contact angle of water is less than 90°.

[26] A kit including the antireflective film according to any one of [1] to [20]; and a cleaning cloth in which hollows or voids with distance smaller than an average primary particle diameter of the particles of the antireflective film according to any one of [1] to [20] are formed, and a contact angle of water is less than 90°.

[27] A method for cleaning an antireflective film, the method including: removing dirt attached to the antireflective film according to any one of [1] to [20], by using a cleaning cloth in which hollows or voids with distance smaller than an average primary particle diameter of the particles of the antireflective film according to any one of [1] to [20] are formed, and a contact angle of water is less than 90°.

According to the invention, it is possible to provide an antireflective film which has sufficient antireflective performances, exhibits excellent planar uniformity, and can be manufactured by a simple method. In addition, according to the invention, it is possible to provide a polarizing plate, a cover glass, and an image display device which have the antireflective film.

Further, according to the invention, it is possible to provide an antireflective film having a moth-eye structure and also having antifouling properties, and thus it is possible to provide a polarizing plate, a cover glass, and an image display device, which have moth-eye structures, to which reflection prevention and antifouling properties are provided, which are practical, and which have satisfactory visibility, by using the antireflective film.

In addition, in the case of a kit including the antireflective film and a cleaning cloth according to the invention, it is possible to easily remove dirt from the antireflective film having the moth-eye structure by cleaning the antireflective film with the cleaning cloth.

DESCRIPTION OF THE PREFERRED EMBODIMENTS

Figure 1:
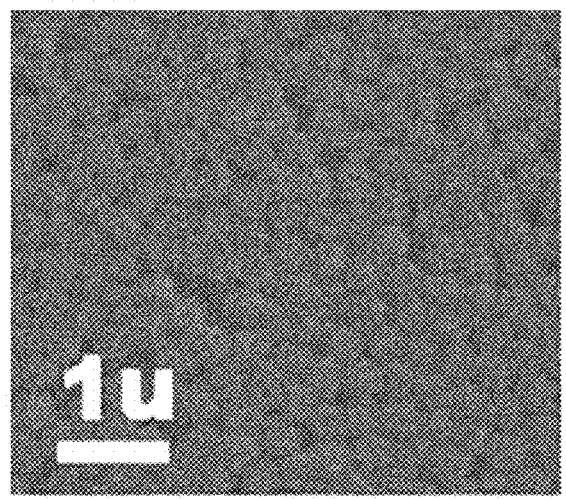
FIG. 1 is a diagram illustrating a picture illustrating a SEM image of a sample No. 2A, which is an example of an antireflective film according to the invention.

A antireflective film according to the invention will be a antireflective film including a plastic substrate, a infiltration layer, and a antireflective layer including particles of which an average primary particle diameter is in the range of 50 nm to 700 nm and a binder resin, in this sequence in an adjacent manner, in which the antireflective layer has a moth-eye structure due to the particles on a surface opposite to the infiltration layer.

Hereinafter, the antireflective film according to the invention is described in detail.

[Plastic Substrate]

The plastic substrate in the antireflective film according to the invention is described.

Various kinds of the plastic substrate can be used, and examples thereof include a substrate containing a cellulose-based resin such as cellulose acylate (cellulose triacetate, diacetyl cellulose, or cellulose acetate butyrate); a polyester resin such as polyethylene terephthalate, a (meth)acryl-based resin, a polyurethane-based resin, polycarbonate, polystyrene, an olefin-based resin, or the like. In view of easy manufacturing of an infiltration layer, a substrate containing cellulose acylate, polyethylene terephthalate, or a (meth)acryl-based resin is preferable, and a substrate containing cellulose acylate is more preferable. As cellulose acylate, a substrate disclosed in JP2012-093723A can be preferably used.

The thickness of the plastic substrate is generally in the range of about 10 μm to 1,000 μm. In view of satisfactory handling properties, high transparency, and obtainable sufficient strength, the thickness is preferably in the range of 20 μm to 200 μm, and more preferably in the range of 25 μm to 100 μm. In terms of the transparency of the plastic substrate, a substrate having transmittance of 90% or more is preferable.

If an infiltration layer can be formed when an antireflective layer is laminated, the plastic substrate may also include a different resin layer on the surface. For example, the plastic substrate may include a hard coat layer for providing hard coat properties to the substrate, an easily adhesive layer for providing adhesiveness to another layer, and a layer for providing antistatic properties, and may include plural layers thereof.

(Hard Coat Layer)

The hard coat layer is preferably formed by a crosslinking reaction or polymerization of an ionization radiation curable compound. For example, the hard coat layer can be formed by coating a transparent support with a coating composition including an ionization radiation curable multi-functional monomer or an ionization radiation curable multi-functional oligomer, and crosslinking-reacting or polymerizing the multi-functional monomer or the multi-functional oligomer.

In order to form an infiltration layer when the antireflective layer is laminated on the hard coat layer, a method in which the hard coat layer is half-cured in advance such that only a portion of the binder can infiltrate the substrate when the substrate is coated with the coating liquid for forming the antireflective layer, and the hard coat layer is fully cured after the infiltration layer is formed, and the like are preferable. If the infiltration layer is manufactured by using such a method, the infiltration layer can have hard coat properties together with antireflective properties.

As a functional group of the ionization radiation curable multi-functional monomer or the ionization radiation curable multi-functional oligomer, a group which is polymerizable with light, an electron beam, or a radioactive ray is preferable. Among them, a photopolymerizable functional group is preferable.

Examples of the photopolymerizable functional group include an unsaturated polymerizable functional group such as a (meth)acryloyl group, a vinyl group, a styryl group, and an allyl group. Among them, a (meth)acryloyl group is preferable.

Specific examples of the compound having the polymerizable unsaturated group include (meth)acrylic acid diesters of alkylene glycol such as neopentyl glycol acrylate, 1,6-hexanediol(meth)acrylate, and propylene glycol di(meth)acrylate;

(meth)acrylic acid diesters of polyoxyalkylene glycol such as triethylene glycol di(meth)acrylate, dipropylene glycol di(meth)acrylate, polyethylene glycol di(meth)acrylate, and polypropylene glycol di(meth)acrylate;

(meth)acrylic acid diesters of polyhydric alcohol such as pentaerythritol di(meth)acrylate; or (meth)acrylic acid diesters of an ethylene oxide or propylene oxide adduct such as 2,2-bis{4-(acryloxy.diethoxy)phenyl}propane, or 2-2-bis{4-(acryloxy.polypropoxy)phenyl}propane.

Further, epoxy(meth)acrylates, urethane(meth)acrylates, and polyester(meth)acrylates are also preferably used as the photopolymerizable multi-functional monomer.

Among them, esters of polyhydric alcohol and a (meth)acrylic acid are preferable. A multi-functional monomer having 3 or more (meth)acryloyl groups in one molecule is more preferable. Examples thereof include pentaerythritol tetra(meth)acrylate, pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate, and caprolactone-modified tris(acryloxyethyl) isocyanurate.

Specific examples of the multi-functional acrylate-based compounds having a (meth)acryloyl group can include esterified materials of polyol and a (meth)acrylic acid such as KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60, and KAYARAD GPO-303, which are manufactured by Nippon Kayaku Co., Ltd., and V#3PA, V#400, V#36095D, V#1000, and V#1080, which are manufactured by Osaka Organic Chemical Industry Ltd.

In addition, tri- or poly-functional urethane acrylate compounds such as SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA, and SHIKOH UV-2750B (manufactured by The Nippon Synthetic Chemical Industry Co., Ltd.), UL-503LN (manufactured by Kyoeisha Chemical Co., Ltd.), UNIDIC 17-806, UNIDIC 17-813, UNIDIC V-4030, and UNIDIC V-4000BA (manufactured by DIC Corporation), EB-1290K, EB-220, EB-5129, EB-1830, and EB-4858 (manufactured by Daicel UCB Co.), HIGH-COAP AU-2010 and HIGH-COAP AU-2020 (manufactured by Tokushiki Co., Ltd.); ARONIX M-1960 (manufactured by Toagosei Co., Ltd.), ART RESIN UN-3320HA, UN-3320HC, UN-3320HS, UN-904, and HDP-4T; and tri- or poly-functional polyester compounds such as ARONIX M-8100, M-8030, and M-9050 (manufactured by Toagosei Co., Ltd.), and KRM-8307 (manufactured by Daicel-Cytec Co., Ltd.) can be suitably used. Particularly, DPHA or PET-30 is preferably used.

Further, examples thereof include resins having 3 or more (meth)acryloyl groups, such as oligomers or prepolymers of multi-functional compounds such as a polyester resin, a polyether resin, an acrylic resin, an epoxy resin, a urethane resin, an alkyd resin, a spiroacetal resin, a polybutadiene resin, a polythiolpolyene resin, and polyhydric alcohol, which have a comparatively low molecular weight.

In addition, dendrimers disclosed in JP2005-76005A and JP2005-36105A or norbornene ring-containing monomers disclosed in JP2005-60425A can be used.

Two or more types of multi-functional monomers may be used in combination. The polymerization of monomers having these ethylenically unsaturated groups can be performed by performing irradiation with an ionization radiation or heating in the existence of a photoradical initiator or a thermal radical initiator.

In view of providing sufficient durability and impact-resistant to the film, the thickness of the hard coat layer is generally in the range of about 0.5 μm to 50 μm and preferably in the range of 1 μm to 20 μm.

In addition, the strength of the hard coat layer is preferably H or more, more preferably 2H or more, and most preferably 3H or more in a pencil hardness test. Further, in a Taber test conforming to JIS K5400, it is preferable if an abrasion loss of a specimen before and after the test is smaller.

(Other Components)

Further, a solvent, polymerization initiator, antistatic agent, antiglare agent, and the like can be appropriately added to the coating composition for forming the hard coat layer, in addition to the components described above. Various types of additives such as reactive or nonreactive leveling agents and various types of sensitizers may be further mixed thereto.

(Solvent of Coating Composition for Forming Hard Coat Layer)

Specific examples of the solvent include isopropanol (IPA), methyl ethyl ketone (MEK), and methyl isobutyl ketone (MIBK), and toluene. In order to improve the hardness of an optical sheet, a non-infiltrative solvent such as MIBK or isopropanol is preferably used in combination. If the non-infiltrative solvent is used in combination, the primary binder component does not infiltrate the triacetyl cellulose substrate, and thus hardness can be increased.

(Polymerization Initiator)

If necessary, radical and cationic polymerization initiators and the like may be appropriately selected to be used. These polymerization initiators are decomposited by photoirradiation and/or heating, radicals or cations are generated, and the radical polymerization and the cationic polymerization proceed.

(Antistatic Agent)

As the specific examples of the antistatic agent, antistatic agents well-known in the related art, such as quaternary ammonium salts, conductive polymers, and conductive microstructured particles can be used in a range in which the infiltration layer can be formed when the antireflective layer is laminated.

(Antiglare Agent)

As the antiglare agent, antiglare agents well-known in the related art, such as antiglare agents of microstructured particles of styrene beads (refractive index: 1.59), polymethyl methacrylate beads (refractive index: 1.49), and methyl methacrylate-styrene copolymers may be used in a range in which the infiltration layer can be formed when the antireflective layer is laminated. When the antiglare agent of the microstructured particles is used, the addition amount thereof is preferably in the range of 2 parts by weight to 30 parts by weight and more preferably in the range of 10 parts by weight to 25 parts by weight, with respect to 100 parts by weight of the curable resin composition.

(Refractive Index Conditioner)

For the purpose of controlling the refractive index of the hard coat layer, a high refractive index monomer or an inorganic particle, or both of them can be added to the binder of the hard coat layer, as the refractive index conditioner, in a range in which the infiltration layer can be formed when the antireflective layer is laminated. In addition to the effect of controlling the refractive index, the inorganic particle has an effect of suppressing curing shrinkage due to the cross-linking reaction. According to the invention, after the hard coat layer is formed, the polymer generated by polymerizing the multi-functional monomer and/or the high refractive index monomer and the inorganic particles dispersed therein are collectively referred to as a binder.

(Leveling Agent)

As specific examples of the leveling agent, fluorine-based or silicone-based leveling agents well-known in the related art can be used. The coating composition for forming the hard coat layer to which the leveling agent is added can provide coating stability to the coated film surface at the time of coating or drying.

[Infiltration Layer]

The antireflective film according to the invention has an infiltration layer adjacent to the plastic substrate and the antireflective layer, between the plastic substrate and the antireflective layer.

According to the invention, the infiltration layer is a layer (region) including a plastic substrate component and a binder resin component of the antireflective layer. The infiltration layer can be obtained by coating the plastic substrate with the coating liquid for forming the antireflective layer which includes a solvent (substrate infiltrative solvent) having infiltration property into the plastic substrate and the binder resin component of the antireflective layer, causing the substrate infiltrative solvent to infiltrate the plastic substrate, and causing the binder resin component of the antireflective layer to infiltrate the plastic substrate. The binder resin component of the antireflective layer in this specification indicates the binder resin or a monomer as the material for the binder resin. The plastic substrate component indicates a component configuring the plastic substrate.

If the plastic substrate includes a different resin layer such as a hard coat layer on the surface thereof, the component that configures the different resin layer is also a plastic substrate component.

Hereinafter, according to the invention, the plastic substrate indicates a portion including the plastic substrate component, and not including the binder resin component of the antireflective layer. In addition, the antireflective layer indicates a portion that includes the binder resin component of the antireflective layer and that does not include the plastic substrate component.

In addition, the infiltration layer can be measured as a portion in which both of the plastic substrate component and the binder resin component of the antireflective layer are detected when the antireflective film according to the invention is cut with a microtome and a cross section thereof is analyzed with a time of flight secondary mass spectrometry (TOF-SIMS). Therefore, the film thickness of this region can be measured from the information of the cross section of the TOF-SIMS in the same manner.

In addition, the infiltration layer can be measured by detecting one different layer between the substrate and the antireflective layer, for example, by observation of the cross section with a thickness monitor using interference of light or a transmission electron microscope (TEM). As the thickness monitor, FE-3000 (manufactured by Otsuka Electronics Co., Ltd.), and the like can be used.

In view of forming a moth-eye layer without making the particle content ratio in the coating composition excessively high, the thickness of the infiltration layer is preferably in the range of 0.1 µm to 5 µm.

In view of effectively forming the infiltration layer, the infiltration layer preferably contains the substrate infiltrative solvent. The content of the substrate infiltrative solvent in the composition for forming the antireflective layer is preferably in the range of 10% by mass to 95% by mass and more preferably in the range of 20% by mass to 90% by mass.

The substrate infiltrative solvent is described below.

[Antireflective Layer]

The antireflective film according to the invention has an antireflective layer which is adjacent to the infiltration layer.

The antireflective layer includes particles of which the average primary particle diameter is in the range of 50 nm to 700 nm, and the binder resin.

The surface of the antireflective layer opposite to the infiltration layer has a moth-eye structure formed by the particles.

Here, the moth-eye structure is a processed surface of the substance (material) for suppressing the reflection of light, and refers to a structure having a periodical microstructured pattern. Particularly, in the case having the purpose of suppressing the reflection of the visible light, the moth-eye structure indicates a structure having a microstructured pattern with a period less than 780 nm. It is preferable that the period of the microstructured pattern is less than 380 nm, since coloring of the reflected light disappears. In addition, it is preferable that the period is 100 nm or longer, since the light having the wavelength of 380 nm causes the microstructured pattern to be recognizable, and antireflective properties become excellent. Whether there is a moth-eye structure can be checked by observing the surface shape with a scanning electron microscope (SEM), an atomic force microscope (AFM), and the like and examining whether the microstructured pattern is made.

The film thickness of the antireflective layer is preferably in the range of 0.05 µM to 5 µM and more preferably in the range of 0.1 µM to 1 µm.

(Particles of which Average Primary Particle Diameter is in the Range of 50 nm to 700 nm)

The particles which are included in the antireflective layer and of which the average primary particle diameter is in the range of 50 nm to 700 nm are described.

Examples of the particles include metal oxide particles, resin particles, and organic and inorganic hybrid particles having a core of a metal oxide particle and a shell of a resin. However, in view of excellent the film strength, metal oxide particles are preferable.

Examples of the metal oxide particles include silica particles, titania particles, zirconia particles, and antimony pentoxide particles. However, silica particles are preferable, since silica particles have a refractive index which is close to that of many binders, it is difficult for hazes to be generated, and thus the moth-eye structure is easily formed.

Examples of the resin particles include polymethyl methacrylate particles, polystyrene particles, and melamine particles.

In view of enabling particles to line up and form the moth-eye structure, the average primary particle diameter of the particles is in the range of 50 nm to 700 nm, preferably in the range of 100 nm to 650 nm, more preferably in the range of 150 nm to 530 nm, and still more preferably in the range of 200 nm to 380 nm. If the particle diameter is the lower limit or more, the suppression effect of the reflection of the visible light can be increased. If the particle diameter is the upper limit or smaller, particles do not work as scattering bodies, and, also in this case, the suppression effect of the reflection of the visible light is excellent.

Two or more types of particles of which the average primary particle diameters are different may be used.

The average primary particle diameter of the particles indicates a 50% particle diameter of the accumulation of the mean volume diameter. If the average primary particle diameter of the particles included in the antireflective film is measured, the particle diameter may be measured by an electron micrograph. For example, a segment TEM image of the antireflective film is photographed, respective diameters of 100 primary particles are measured, and volumes thereof are calculated such that the accumulative 50% particle diameter can be set to be the average primary particle diameter. If the particles are not spherical, an average value of a major axis and a minor axis is considered as a diameter of the primary particle.

The shape of the particle is most preferably a spherical shape, but may be an indefinite shape other than the spherical shape.

In addition, the silica particles may be crystalline or amorphous.

For improvement of dispersibility in a coating liquid, improvement of film strength, and prevention of aggregation, the particles may be subjected to a surface treatment. Particularly, in view of improving the film strength, the particles are preferably particles subjected to a treatment with a compound having an unsaturated double bond on the surface thereof. Specific examples and preferred examples of the surface treatment method are as disclosed in "0119" to "0147" of JP2007-298974A.

In order to provide antifouling properties to the antireflective layer having the moth-eye structure, the particles may be subjected to a water- and oil-repellency treatment on the particle surface. It is more preferable that these particles are used in combination with a case where an antifouling agent is added to the antireflective layer described below, for maintaining antifouling properties particularly when dirt is repeatedly attached. As the water- and oil-repellency treatment, a dry processing or wet processing is preferably performed by using fluorine-containing alkoxysilane or alkoxysilane having a polydimethyl siloxane unit in a molecule.

Examples of the fluorine-containing alkoxysilane include fluoroalkyl group-containing oligomers such as KP-801M (manufactured by Shin-Etsu Chemical Co., Ltd.), X-24-7890 (manufactured by Shin-Etsu Chemical Co., Ltd.), KBM-7803 (trifluoropropyltrimethoxysilane, manufactured by Shin-Etsu Chemical Co., Ltd.), SIH5841.5 (heptadecafluoro-1,1,2,2,-tetrahydrodecyltrimethoxysilane, manufactured by Gelest, Inc.), SIH5841.2 (heptadecafluoro-1,1,2,2-tetrahydrodecyltriethoxysilane, manufactured by Gelest, Inc.). In addition, examples of the alkoxysilane having a polydimethyl siloxane unit in a molecule include KPN-3504 (manufactured by Shin-Etsu Chemical Co., Ltd.), DMS-XE11 (ethoxy-terminated polydimethylsiloxane, manufactured by Gelest, Inc.), DMS-XM11 (methoxy-terminated polydimethylsiloxane, manufactured by Gelest, Inc.), and DMS-S12, -S14, and -S15 (silanol-terminated polydimethylsiloxane).

As the dry processing, a method of performing a treatment by uniformly dispersing an undiluted liquid of alkoxysilane in a filler which rotates at a high speed by a stirrer is used. A uniform dry processing is difficult, but a massive amount of filler can be treated in a short period of time, and thus the dry processing is widely used for industrial uses. It is known that, if the treatment is performed on the dried filler, the treatment efficiency increases by making the filler wet in advance.

The wet processing is generally a method of immersing a filler in a weak solution of alkoxysilane. Since hydrophobicity is high and a treatment in a water single system is difficult, alkylsilanes, particularly, long-chain alkylsilane and fluoroalkylsilane are suitably treated in a water•alcohol mixed solution of which pH is adjusted with an acetic acid or the like. Since the surface of the filler can be treated in a uniform manner, a highly accurate treatment can be performed.

Further, it is preferable to sequentially perform a dry processing and a wet processing. It is possible to manufacture particles with a higher surface treatment rate that cannot be achieved by only one treatment or particles subjected to two different types of surface treatments.

Particularly, it is preferable that a method disclosed in "0055" to "0072" of JP2008-137854A is appropriately used as a method of performing a surface treatment on calcined silica particles and performing crushing and classifying.

As specific examples of the particles of which the average primary particle diameter is in the range of 50 nm to 700 nm, MEK-ST-L (average primary particle diameter: 50 nm, silica sol manufactured by Nissan Chemical Industries, Ltd.), SEAHOSTAR KE-P10 (average primary particle diameter: 150 nm, amorphous silica manufactured by Nippon Shokubai Co., Ltd.), SEAHOSTAR KE-P30 (average primary particle diameter: 300 nm, amorphous silica manufactured by Nippon Shokubai Co., Ltd.), SEAHOSTAR KE-P50 (average primary particle diameter: 550 nm, amorphous silica manufactured by Nippon Shokubai Co., Ltd.), SEAHOSTAR KE-S30 (average primary particle diameter: 300 nm, heat resistance: 1,000° C., calcined silica manufactured by Nippon Shokubai Co., Ltd.), SEAHOSTAR KE-S50 (average primary particle diameter: 500 nm, heat resistance: 1,000° C., calcined silica manufactured by Nippon Shokubai Co., Ltd.), EPOSTAR S (average primary particle diameter: 200 nm, a melamine.formaldehyde condensate manufactured by Nippon Shokubai Co., Ltd.), EPOSTAR MA-MX100W (average primary particle diameter: 175 nm, polymethyl methacrylate (PMMA)-based crosslinked material manufactured by Nippon Shokubai Co., Ltd.), EPOSTAR MA-MX200W (average primary particle diameter: 350 nm, polymethyl methacrylate (PMMA)-based crosslinked material manufactured by Nippon Shokubai Co., Ltd.), STAPHYROID (multilayer structural organic microstructured particles manufactured by Aica Kogyo Co., Ltd.), GANZPEARL (polymethyl methacrylate, polystyrene particles manufactured by Aica Kogyo Co., Ltd.), and the like can be preferably used.

The content ratio of the particles in the coating liquid for forming the antireflective layer of the antireflective film according to the invention is preferably in the range of 3% by mass to 50% by mass, more preferably in the range of 3% by mass to 40% by mass, and still more preferably in the range of 5% by mass to 20% by mass, in solid content. If the content ratio is the lower limit or more, since many convex portions in the moth-eye structure can be formed, antireflective properties are further improved easily. If the content ratio is the upper limit or smaller, it is difficult for aggregation in the liquid to occur, and the satisfactory moth-eye structure is easily formed.

It is preferable that one type of monodispersed silica microstructured particles of which the average primary particle diameter is in the range of 50 nm to 200 nm, and a Cv value is less than 5% is contained, since the height of unevenness in the moth-eye structure becomes uniform, and reflectance further decreases. The Cv value is generally measured by using a laser diffraction particle size analyzer, but another particle diameter measuring method may be used, or a particle diameter distribution can be obtained and calculated by an image analysis from a SEM image of the surface of the antireflective layer according to the invention. The Cv value is more preferably less than 3%.

(Binder Resin of Antireflective Layer)

The binder resin of the antireflective layer, which is included in the coating composition for forming the antireflective layer is described.

The binder resin of the antireflective layer is preferably a binder resin which is obtained by curing a polymerizable compound (monomer) for forming the binder resin.

Examples of the monomer include compounds having polymerizable functional groups (polymerizable unsaturated double bond) such as a (meth)acryloyl group, a vinyl group, a styryl group, and an allyl group. Among them, compounds having a (meth)acryloyl group and a —C(O)OCH=CH$_2$ are preferable, and a compound having a (meth)acryloyl group is more preferable.

Specific examples of the compound having the polymerizable functional group include (meth)acrylic acid diesters of alkylene glycol, (meth)acrylic acid diesters of polyoxyalkylene glycol, (meth)acrylic acid diesters of polyhydric alcohol, (meth)acrylic acid diesters of ethylene oxide or propylene oxide adducts, epoxy(meth)acrylates, urethane (meth)acrylates, and polyester(meth)acrylates.

Among them, esters of polyhydric alcohol and (meth) acrylic acid are preferable. Examples thereof include pentaerythritol tetra(meth)acrylate, pentaerythritol tri(meth) acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, urethane acrylate, polyester polyacrylate, and caprolactone-modified tris(acryloxyethyl) isocyanurate.

The binder resin preferably includes a resin which is obtained by curing a compound having a (meth)acryloyl group having a molecular weight in the range of 150 to 1,600. The molecular weight of the compound having a (meth)acryloyl group is more preferably in the range of 170 to 1,400 and still more preferably in the range of 200 to 1,200. If the molecular weight is the lower limit or more, the strength of the antireflective layer can be caused to be sufficiently strong. If the molecular weight is the upper limit or smaller, the satisfactory infiltration layer is easily formed.

In addition, if the compound is a polymer, the molecular weight described above is a mass average molecular weight calculated by polystyrene measured by gel permeation chromatography.

In view of infiltration property to the substrate, the binder resin of the antireflective layer preferably includes a resin which is obtained by curing a compound having a (meth)acryloyl group and having a SP value in the range of 20 to 25. The SP value of the compound having a (meth)acryloyl group is preferably within ±4 and more preferably within ±2, with respect to the SP value of the substrate surface.

In addition, the SP value (solubility parameter) according to the invention is a value calculated by the Hoy method, and the by method is disclosed in the Fourth Edition of Polymer Handbook.

<(a) Compound Having 2 or Less Polymerizable Functional Groups in One Molecule>

As the polymerizable compound, in view of causing the compound to easily infiltrate the plastic substrate, (a) a compound having 2 or less polymerizable functional groups in one molecule is preferable.

As the compound (a), a compound of which a mass average molecular weight $Mw_a$ is in the range of $40<Mw_a<500$, and of which a SP value ($SP_a$) by the Hoy method is in the range of $19<SP_a<24.5$ is preferable. The compound having this molecular weight and this SP value is a compound that easily infiltrates the plastic substrate (particularly, cellulose acylate substrate) and a compound which is preferable for forming an infiltration layer between the plastic substrate and the antireflective layer. In addition, since the number of the polymerizable functional groups is 2 or less, the shrinkage at the time of curing is small, and even if the compound infiltrates the plastic substrate and is cured, curling does not occur.

The number of the polymerizable functional groups in one molecule is preferably 1 or 2 and more preferably 1.

Examples of (a) the compound having 2 or less functional groups in one molecule include compounds having the polymerizable functional groups (polymerizable unsaturated double bonds) such as a (meth)acryloyl group, a vinyl group, a styryl group, and an allyl group. Among them, compounds having a (meth)acryloyl group and —C(O)OCH=CH$_2$ are preferable.

Specific examples of (a) the compound having 2 or less functional groups in one molecule include (meth)acrylic acid diesters of alkylene glycol such as neopentyl glycol diacrylate, 1,6-hexanediol di(meth)acrylate, ethylene glycol di(meth)acrylate, and propylene glycol di(meth)acrylate;

(meth)acrylic acid diesters of polyoxyalkylene glycol such as polyethylene glycol di(meth)acrylate in which a repeating number of an ethylene unit is 8 or less, such as diethylene glycol di(meth)acrylate, and triethylene glycol di(meth)acrylate, and polypropylene glycol di(meth)acrylate in which a repeating number of a propylene unit is 6 or less, such as dipropylene glycol di(meth)acrylate and tripropylene glycol di(meth)acrylate;

(meth)acrylic acid diesters of polyhydric alcohol such as pentaerythritol di(meth)acrylate, 1,4-cyclohexane diacrylate, and tricyclodecane dimethanol di(meth)acrylate;

(meth)acrylic acid diesters of ethylene oxide adducts such as 2,2-bis{4-(methacryloxy.ethoxy)phenyl}propane and 2,2-bis{4-(acryloxy.diethoxy)phenyl}propane; and monofunctional (meth)acrylic acid esters such as isobornyl(meth)acrylate, octyl(meth)acrylate, decyl(meth)acrylate, aliphatic epoxy(meth)acrylate, ethoxylated phenyl (meth)acrylate, β-carboxyethyl(meth)acrylate, methoxypolyethylene glycol(meth)acrylate, phenoxy polyethylene glycol(meth)acrylate, 2-(meth)acryloyloxyethyl succinate, glycerol mono(meth)acrylate, 2-hydroxyethyl (meth)acrylate, cyclohexyl(meth)acrylate, and lauryl(meth) acrylate.

(Dispersing Agent)

In order to prevent aggregation of the particles, a dispersing agent may be contained in the antireflective layer of the antireflective film according to the invention. The dispersing agent is not particularly limited, but an anionic compound such as sulfate and phosphate, a cationic compound such as aliphatic amine salt and quaternary ammonium salt, a nonionic compound, and a polymer compound are preferable. A polymer compound is more preferable, since respective adsorbing groups and stereoscopic repulsion groups are very freely selected.

As the dispersing agent, commercially available products may be used. Examples thereof include DISPERBYK160, DISPERBYK161, DISPERBYK162, DISPERBYK163, DISPERBYK164, DISPERBYK166, DISPERBYK167, DISPERBYK171, DISPERBYK180, DISPERBYK182, DISPERBYK2000, DISPERBYK2001, DISPERBYK2164, Bykumen, BYK-P104, BYK-P104S, BYK-220S, Anti-Terra203, Anti-Terra204, Anti-Terra205 (all of which are product names), and the like manufactured by BYK Japan KK.

If the antireflective layer includes a dispersing agent, the content of the dispersing agent is preferably in the range of 0.01% by mass to 20% by mass, more preferably in the range of 0.05% by mass to 10% by mass, and still more preferably in the range of 0.1% by mass to 5% by mass, with respect to an amount of the particles.

(Leveling Agent)

A leveling agent (also referred to as an "antifouling agent") may be contained in the antireflective layer of the antireflective film according to the invention.

As specific examples of the leveling agent, fluorine-based or silicone-based leveling agents well-known in the related art can be used. The coating composition for forming the antireflective layer to which the leveling agent is added can provide coating stability, sliding properties, antifouling properties, and abrasion resistance to the coated film surface at the time of coating or drying.

In view of the antifouling properties, with respect to the antireflective film according to the invention, a contact angle of water is preferably 100° or more, more preferably 110° or more, and still more preferably 120° or more.

In order to provide antifouling properties to the antireflective film, the fluorine-containing compound or the silicone compound in the range of 1% by mass or less with respect to the total amount of the antireflective layer is contained in the antireflective layer.

It is preferable that the fluorine-containing compound or the silicone compound includes a polymerizable group in the molecule.

It is preferable that the fluorine compound has a polyether compound in the molecule.

It is preferable that the silicone compound has a polydimethyl siloxane unit of which the molecular weight is 1,000 or more.

Particularly, in order to provide antifouling properties, it is preferable to appropriately use an antifouling agent used in a hard coat layer disclosed in "0012" to "0101" of JP2012-88699A, but a difference at the time of adding the antifouling agent to the antireflective film having the moth-eye structure according to the invention is a difference of the addition amount in the composition described below.

[Addition Amount of Fluorine-Containing Antifouling Agent]

The addition amount of the fluorine-containing antifouling agent having the polymerizable unsaturated group is preferably in the range of 2% by mass or less, more preferably in the range of 0.0001% by mass to 1% by mass, still more preferably in the range of 0.0005% by mass to 0.5% by mass, and particularly preferably in the range of 0.001% by mass to 0.1% by mass, with respect to the total solid content in the composition for forming the antireflective layer. If the addition amount is 0.0001% by mass or more, the existence ratio of the antifouling agent having water- and oil-repellency on the surface becomes proper, and thus sufficient antifouling properties can be obtained. In addition, it is preferable that the addition amount is 1% by mass or less, since an amount of the antifouling agent educed on the surface does not become great, the film strength is deteriorated, and reflectance does not increase due to the cloudiness of the film.

[Addition Amount of Polysiloxane Antifouling Agent]

The addition amount of the polysiloxane antifouling agent is preferably in the range of 2% by mass or less, more preferably in the range of 0.0001% by mass to 1% by mass, still more preferably in the range of 0.0005% by mass to 0.5% by mass, and particularly preferably in the range of 0.001% by mass to 0.1% by mass with respect to the total solid content in the composition for forming the antireflective layer. If the addition amount is 0.0001% by mass or more, the existence ratio of the antifouling agent having water and oil repellency on the surface becomes proper, and sufficient antifouling properties can be obtained. In addition, it is preferable that the addition amount is 1% by mass or less, since an amount of the antifouling agent deposited on the surface does not become great, the film strength is not deteriorated, and reflectance does not increase due to the cloudiness of the film.

[Contact Angle of Antireflective Layer Having Moth-Eye Structure]

The moth-eye structure has very small unevenness, and thus, if the fluorine-containing compound or the polysiloxane compound is evenly present on the surface, a water repellent phenomenon which is a so-called Lotus effect can be generated, such that the contact angle with respect to water becomes 100° or more, and antifouling properties become very satisfactory compared with the case where the compound is present on an even surface.

It is particularly preferable that the antireflective film according to the invention contains the fluorine-containing compound or the silicone compound, the contact angle of water is 110° or more, and the contact angle of an oleic acid is 75° or more. The contact angle of the oleic acid is preferably 80° or more and more preferably 85° or more. If the contact angle with respect to an oleic acid is 75° or more, the contact angle is satisfactory since the adhesiveness of oil or sebum of a human, particularly, fingerprints are remarkably suppressed.

As a method of providing antifouling properties to the antireflective film having the moth-eye structure according to the invention, as also disclosed in JP1995-98401A (JP-H7-98401A), there is a way of forming a fluorine-containing layer (=antifouling layer) of which a refractive index is 1.40 or less as a different layer by dipping or a way of forming an antifouling layer by coating. However, in these ways, concave portions in the moth-eye structure are necessarily buried, and reflectance is deteriorated. A way of adding a small amount of an antifouling agent in the composition for the antireflective layer and causing the antifouling agent to be present on a surface is preferable, and it is more preferable that a reactive group with particles is included in a structure of the antifouling agent, since the antifouling agent is bonded to convex portions due to the particles and thus antifouling properties are provided and maintained. For example, it is particularly preferable to combine an antifouling agent containing, for example, an alkoxy silane structure with acid catalyst, basic catalyst, metal chelate catalyst, and the like and to add the antifouling agent to the composition for the antireflective layer.

The invention also relates to a cloth for cleaning an antireflective film, a kit including an antireflective film and a cleaning cloth, and a method for cleaning an antireflective film.

As the cleaning method for removing dirt attached to the antireflective film having the moth-eye structure according to the invention, a specific cleaning cloth is preferably used. As the cleaning cloth, it is preferable to have hollows or voids which are smaller than the moth-eye structure. Specifically, it is preferable to have hollows or voids in the range of 50 nm to 380 nm which is the visible light wavelength or smaller, hollows or voids are more preferably in the range of 50 nm to 300 nm, and hollows or voids are most preferably in the range of 50 nm to 200 nm. As a method of manufacturing the cleaning cloth, it is preferable to use a blended yarn disclosed in JP2012-207322A which includes two or more types of polyester long fibers and which is a nanofiber blended yarn in which at least one kind of the polyester long fibers is made of polypropylene terephthalate or polybutylene terephthalate, a stretch elongation ratio at the time of 20% extension is 70% or more, and a diameter of short fibers is in the range of 50 nm to 900 nm.

Further, the water contact angle of the cleaning cloth is preferably less than 90°, more preferably less than 50°, and still more preferably less than 30°. It is not inappropriate for a cloth using the nanofiber blended yarn disclosed in JP2012-207322A as it is, to have a water contact angle of 90° or more, and thus the cloth is required to be subjected to a hydrophilizing treatment such as a corona treatment and a saponification treatment.

The saponification treatment is a treatment of immersing the nanofiber blended yarn for a certain period of time in a heated alkali aqueous solution, washing the nanofiber blended yarn, and performing acid cleaning for neutralization. If the nanofiber blended yarn is hydrophilized, any types of treatment conditions can be used without problem, and thus a concentration of a treatment agent, a temperature of a treatment agent liquid, and a treatment time are appropriately determined. However, in order to secure productivity, treatment conditions are generally determined so that the treatment can be completed within 3 minutes. As general conditions, an alkali concentration is in the range of 3% by mass to 25% by mass, a treatment temperature is in the range of 30° C. to 70° C., and a treatment time is in the range of 15 seconds to 5 minutes. As a type of the alkali used in an alkali treatment, sodium hydroxide and potassium hydroxide are preferable. As an acid used in the acid cleaning, a sulfuric acid is preferable. As water used in the washing, ion exchange water or pure water is preferable.

With respect to the antireflective film according to the invention, throughout the entire range of the wavelength in the range of 380 nm to 780 nm, integrated reflectance is preferably 3% or less and more preferably 2% or less.

With respect to the antireflective film according to the invention, a haze value is preferably 5% or less and more preferably 3% or less.

[Method for Producing Antireflective Film]

The method for producing the antireflective film according to the invention is a method for producing an antireflective film that includes a plastic substrate, an infiltration layer, and an antireflective layer including particles of which an average primary particle diameter is in the range of 50 nm to 700 nm and a binder resin, in this order in an adjacent manner, in which the antireflective layer has a moth-eye structure formed by the particles on a surface opposite to the infiltration layer, and a method for producing the antireflective film that forms the infiltration layer and the antireflective layer having the moth-eye structure formed by the particles on the surface opposite to the infiltration layer, by coating the plastic substrate with a composition including particles of which an average primary particle diameter is in the range of 50 nm to 700 nm, a polymerizable compound for forming a binder resin, and a solvent having infiltration property into the plastic substrate; causing the solvent having infiltration property into the plastic substrate and a portion of the polymerizable compound for forming the binder resin to infiltrate the plastic substrate; and curing the polymerizable compound for forming the binder resin by ionization radiation irradiation or heating.

(Composition Including Particles of which Average Primary Particle Diameter is in the Range of 50 nm to 700 nm, Polymerizable Compound for Forming Binder Resin, and Solvent Having Infiltration Property into Plastic Substrate)

A composition (hereinafter, referred to as "composition (A)") including particles of which the average primary particle diameter is in the range of 50 nm to 700 nm, a polymerizable compound for forming the binder resin, and a solvent having infiltration property into the plastic substrate is described.

In the composition (A), the particles of which an average primary particle diameter is in the range of 50 nm to 700 nm and the polymerizable compound for forming the binder resin are as described above.

(Solvent Having Infiltration Property into Plastic Substrate)

The solvent (substrate infiltrative solvent) having infiltration property into the plastic substrate according to the invention is described.

The solvent having infiltration property into the plastic substrate is a solvent having dissolution ability and swelling ability with respect to the surface of the plastic substrate.

If the solvent has dissolution ability and swelling ability with respect to the surface of the plastic substrate, the binder resin infiltrates the plastic substrate and can evenly form the moth-eye structure.

Here, the solvent having dissolution ability with respect to the transparent substrate according to the invention means a solvent of which a peak area of a substrate component (if the substrate has plural layers, a component of the surface thereof) is 400 mV/sec or more, when a substrate film having a size of 24 mm×36 mm (thickness: 80 µm) is immersed for 60 seconds at room temperature (25° C.) in a 15-cc bottle filled with the solvent, and the immersed solution is analyzed by gel permeation chromatography (GPC). Otherwise, if a substrate film having a size of 24 mm×36 mm (thickness: 80 µm) is left for 24 hours at room temperature (25° C.) in a 15-cc bottle filled with the solvent, the bottle is appropriately shook, and the film is completely dissolved so that a shape thereof disappears, the solvent means a solvent having dissolution ability with respect to the substrate.

The substrate infiltrative solvent varies according to components configuring the plastic substrate. In the case of the cellulose acylate substrate, methyl ethyl ketone (MEK), dimethyl carbonate, methyl acetate, acetone, methylene chloride, and the like can be preferably used, but the substrate infiltrative solvent is not limited thereto, as long as the substrate infiltrative solvent can dissolve the substrate. Methyl ethyl ketone (MEK), dimethyl carbonate, and methyl acetate are more preferable.

In the case of the acryl substrate, dimethyl carbonate, methyl ethyl carbonate, diethyl carbonate, acetone, methyl ethyl ketone (MEK), cyclopentanone, methyl acetate cyclohexanone, ethyl acetate, and the like are preferable.

The composition (A) may include a solvent other than the substrate infiltrative solvent.

With respect to the composition (A), in view of providing coating properties without preventing the binder infiltration, the content of the substrate infiltrative solvent is preferably in the range of 5% by mass to 90% by mass with respect to the total mass of the composition (A).

In view of efficiently forming the infiltration layer, the solid concentration of the composition (A) is preferably in the range of 5% by mass to 90% by mass.

With respect to the composition (A), in view of effectively forming the infiltration layer, the content of the polymerizable compound for forming the binder resin is preferably in the range of 50% by mass to 97% by mass with respect to the total mass of the solid content of the composition (A).

(Polymerization Initiator)

A polymerization initiator may be included in the composition (A).

If the polymerizable compound for forming the binder resin is a photopolymerizable compound, a photopolymerization initiator is preferably included.

Examples of the photopolymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borate salts, active esters, active halogens, inorganic complexes, and coumarins. Specific examples, preferred embodiments, commercially available products, and the like of the photopolymerization initiator are disclosed in Paragraphs "0133" to "0151" of JP2009-098658A and the examples may be appropriately used in the invention in the same manner.

Various examples are also disclosed in "Recent UV Curing Process" {Technical Information Institute Co., Ltd.} (1991), p. 159 and "Ultraviolet Ray Curing System" written by Kiyomi KATO (1989, issued by United Engineering Center), p. 65 to p. 148, and are useful in the invention.

In order to set the content to be sufficiently great for polymerizing a polymerizable compound included in the composition (A) and to be sufficiently small for causing a starting point not to excessively increase, the content of the photopolymerization initiator in the composition (A) is preferably in the range of 0.5% by mass to 8% by mass and more preferably in the range of 1% by mass to 5% by mass, with respect to the total solid content in the composition (A).

The method of coating the composition (A) is not particularly limited, and the well-known method can be used. Examples thereof include a dip coating method, an air knife coating method, a curtain coating method, a roller coating method, a wire bar coating method, a gravure coating method, and a die coating method.

If the plastic substrate is coated with the composition (A), a solvent having infiltration property into the plastic substrate infiltrates the plastic substrate. At this point, a portion of the polymerizable compound for forming the binder resin also infiltrates the plastic substrate. Thereafter, the polymerizable compound for forming the binder resin is cured by the ionization radiation irradiation or the heating, so as to form the infiltration layer and the antireflective layer. Particles of which the average primary particle diameter is in the range of 50 nm to 700 nm and the binder resin are included in the antireflective layer, but, since the portion of the polymerizable compound for forming the binder resin described above infiltrates the plastic substrate, a ratio of particles to the binder resin in the antireflective layer becomes greater than a ratio of the particles to the polymerizable compound for forming the binder resin in the composition (A), such that a moth-eye structure formed by the particles is formed on the surface opposite to the infiltration layer.

The binder that infiltrates the plastic substrate and forms the infiltration layer is preferably 50% by mass or more with respect to the total binder included in the composition for forming the antireflective layer. In addition, it is preferable that the binder is caused to infiltrate the plastic substrate such that the film thickness of the infiltration layer is twice the film thickness of the antireflective layer. If the infiltration layer is formed in this manner, the particles do not aggregate before coating and a uniform moth-eye structure can be formed after coating.

[Polarizing Plate Protective Film]

The antireflective film according to the invention can be used as a film (polarizing plate protective film) for protecting a surface of a polarizing film.

It is preferable that a film other than the antireflective film according to the invention among two sheets of polarizer protective films is an optical compensation film having an optical compensation layer formed by including an optically anisotropic layer. The optical compensation film (retardation film) can improve view angle characteristics of a liquid crystal display screen. As the optical compensation film, well-known optical compensation films may be used, but in view of widening a view angle, an optical compensation film disclosed in JP2001-100042A is preferable.

Before being bonded to a polarizer, the antireflective film according to the invention may be subjected to a saponification treatment. The saponification treatment is a treatment of immersing an optical film for a certain period of time in a heated alkali aqueous solution, performing washing with water, and performing acid cleaning for neutralization. If a surface on a side which is bonded to a polarizing film of a transparent support is hydrophilized, any types of treatment conditions do not matter, and thus a concentration of a treatment agent, a temperature of a treatment agent liquid, and a treatment time are appropriately determined. However, in order to secure productivity, treatment conditions are generally determined so that the treatment is completed within 3 minutes. As general conditions, an alkali concentration is in the range of 3% by mass to 25% by mass, a treatment temperature is in the range of 30° C. to 70° C., and a treatment time is in the range of 15 seconds to 5 minutes. As a type of the alkali used in an alkali treatment, sodium hydroxide and potassium hydroxide are preferable. As an acid used in the acid cleaning, a sulfuric acid is preferable. As water used in the washing with water, ion exchange water or pure water is preferable.

A surface of the plastic substrate on the opposite side of a side on which the antireflective layer according to the invention is provided is subjected to a saponification treatment and bonded to the polarizer by using a polyvinyl alcohol aqueous solution.

In addition, an ultraviolet ray curing-type adhesive agent may be used for bonding the antireflective film according to the invention and the polarizer to each other. It is preferable that an ultraviolet ray curing-type adhesive layer is provided on the surface of the plastic substrate on the opposite side of a side on which the antireflective layer according to the invention is provided. Particularly, for the purpose of improving productivity due to drying in a short period of time, it is preferable to bond the antireflective film according to the invention to the polarizer by using a specific ultraviolet ray curing resin. For example, in JP2012-144690A, adhesiveness, durability, and water resistance are improved by bonding an antireflective film to a polarizer through an adhesive layer including three types of compounds: 20% by mass to 60% by mass of a radical polymerizable compound of which Tg of each homopolymer is 60° C. or more and a SP value is in the range of 29 to 32; 10% by mass to 30% by mass of a radical polymerizable compound of which a SP value is in the range of 18 to 21; and 20% by mass to 60% by mass of a radical polymerizable compound of which a SP value is in the range of 21 to 23. If this adhesive layer is used, before being bonded to the polarizer, the antireflective film having the moth-eye structure according to the invention may be or may not be subjected to a saponification treatment.

[Polarizing Plate]

The polarizing plate according to the invention is a polarizing plate having a polarizer and at least one sheet of a protective film that protects the polarizer, and the at least one sheet of protective film is the antireflective film according to the invention. The polarizer may be interposed between the protective film and the retardation film, or may be a combination of the protective film and the polarizer.

Examples of the polarizer include an iodine-based polarizing film, a dye-based polarizing film using a dichroic dye, and a polyene-based polarizing film. The iodine-based polarizing film and the dye-based polarizing film can be generally produced by using a polyvinyl alcohol-based film.

[Cover Glass]

The cover glass according to the invention has the antireflective film according to the invention as a protective film.

[Image Display Device]

The image display device according to the invention has the antireflective film or the polarizing plate according to the invention.

The antireflective film and the polarizing plate according to the invention can be appropriately used as an image display device such as a liquid crystal display device (LCD), a plasma display panel (PDP), an electroluminescent display (ELD), or a cathode ray tube display device (CRT), and particularly, a liquid crystal display apparatus is preferable.

Generally, the liquid crystal display device has a liquid crystal cell and two sheets of polarizing plates disposed on both sides thereof, and the liquid crystal cell carries liquid crystal between the two sheets of electrode substrates. Further, one sheet of an optically anisotropic layer may be disposed between a liquid crystal cell and one polarizing plate, or two sheets of optically anisotropic layers may be disposed between a liquid crystal cell and both of the polarizing plates. As the liquid crystal cell, a TN mode liquid crystal cell, a VA mode liquid crystal cell, an OCB mode liquid crystal cell, an IPS mode liquid crystal cell, or an ECB mode liquid crystal cell are preferable.

[Kit Including Antireflective Film and Cleaning Cloth]

The antireflective film according to the invention has hollows or voids with distance smaller than the average primary particle diameter of the particles of the antireflective layer, and dirt attached to the antireflective layer can be effectively removed by being cleaned with a cleaning cloth of which a contact angle of water is less than 90°.

That is, the kit according to the invention includes the antireflective film according to the invention and the cleaning cloth described above.

In addition, the method for cleaning the antireflective film according to the invention is a method for cleaning the antireflective film according to the invention, by removing dirt attached to an antireflective film by using the cleaning cloth.

EXAMPLES

Hereinafter, the invention is specifically described with reference to examples. Materials, reagents, substance amounts and ratios thereof, operations, and the like which are described in the examples below can be appropriately changed without departing from the gist of the invention. Accordingly, the scope of the invention is not limited to the specific examples described below.

Example 1

[Manufacturing Antireflective Film]

As described below, antireflective film samples Nos. 1A to 20A were prepared by preparing compositions for forming antireflective layers and coating transparent substrates with the compositions.

(Preparing Particle Dispersion Liquid B-1)

480 parts by mass of methanol was added to 100 parts by mass of KE-P30 (SEAHOSTAR manufactured by Nippon Shokubai Co., Ltd., amorphous silica particles, average particle diameter: 0.3 μm) and was stirred in a mixing tank, so as to obtain 20% by mass of a silica dispersion liquid. Further, 20 parts by mass of acryloyloxypropyltrimethoxysilane and 1.5 parts by mass of diisopropoxy aluminum ethyl acetate were added thereto and mixed, and 9 parts by mass of ion exchange water was added. Reaction was performed for 8 hours at 60° C., cooling was performed to room temperature, and 1.8 parts by mass of acetyl acetone was added. While MEK was added such that the total liquid amount is substantially constant, the solvent was substituted by distillation under reduced pressure. Finally, the solid content was adjusted to be 20% by mass, so as to prepare a dispersion liquid B-1.

(Preparing Composition for Forming Antireflective Layer)

Respective components were added so as to be the composition of a composition for forming an antireflective layer A-1 presented in Table 1 below, an obtained composition was put into a mixing tank, stirred, and filtered with a polypropylene filter having a pore size of 5 μm so as to obtain the composition for forming the antireflective layer A-1 (Solid content concentration: 50% by mass).

In the same method as in the composition for forming the antireflective layer A-1, respective components were mixed to be the composition of Table 1 below and adjusted to be a composition ratio (on a mass basis) presented in Table 1, and compositions for forming the antireflective layer A-2 to A-20 which have a solid content concentration of 50% by mass were manufactured.

Respective compounds used are described below.

PETA (Product name: PET30): Mixture of pentaerythritol tetraacrylate and pentaerythritol triacrylate (manufactured by Nippon Kayaku Co., Ltd., SP value: 21.2)

HEMA: 2-Hydroxyethyl methacrylate (manufactured by Mitsubishi Rayon Co., Ltd., SP value: 26.5)

TMPTA: Trimethylol propane triacrylate (manufactured by Toagosei Co., Ltd., SP value: 20)

BLEMMER GLM: Glycerin monomethacrylate (manufactured by NOF Corporation, SP value: 26.5)

Irg. 184: Photopolymerization initiator, IRGACURE 184 (manufactured by BASF Japan Ltd.)

Irg. 907: Photopolymerization initiator, IRGACURE 907 (manufactured by BASF Japan Ltd.))

Irg. 127: Photopolymerization initiator, IRGACURE 127 (manufactured by BASF Japan Ltd.))

KE-P10: Amorphous silica particles SEAHOSTAR manufactured by Nippon Shokubai Co., Ltd., average particle diameter: 0.15 μm KE-P30: Amorphous silica particles SEAHOSTAR manufactured by Nippon Shokubai Co., Ltd., average particle diameter: 0.30 μm KE-P50: Amorphous silica particles SEAHOSTAR manufactured by Nippon Shokubai Co., Ltd., average particle diameter: 0.55 μm Particles A: Product having different particle diameter of amorphous silica particle SEAHOSTAR KE-P30 manufactured by Nippon Shokubai Co., Ltd., average particle diameter: 0.20 μm Particles B: Product having different particle diameter of amorphous silica particle SEAHOSTAR KE-P50 manufactured by Nippon Shokubai Co., Ltd., average particle diameter: 0.70 μm Particles C: Product having different particle diameter of amorphous silica particle SEAHOSTAR KE-P10 manufactured by Nippon Shokubai Co., Ltd., average particle diameter: 0.05 μm Particles D: Product subjected to dry surface treatment KPN-3504 (manufactured by Shin-Etsu Chemical Co., Ltd.) of amorphous silica particle SEAHOSTAR KE-P30 manufactured by Nippon Shokubai Co., Ltd., average particle diameter: 0.30 μm Particles E: Product subjected to dry surface treatment KPN-3504 (manufactured by Shin-Etsu Chemical Co., Ltd.) having different particle diameter of amorphous silica particle SEAHOSTAR KE-P30 manufactured by Nippon Shokubai Co., Ltd., average particle diameter: 0.20 μm Particles F: Product subjected to dry surface treatment KPM-7803 (manufactured by Shin-Etsu Chemical Co., Ltd.) of amorphous silica particle SEAHOSTAR KE-P30 manufactured by Nippon Shokubai Co., Ltd., average particle diameter: 0.30 μM Particles G: Product subjected to dry surface treatment KPM-7803 (manufactured by Shin-Etsu Chemical Co., Ltd.) having different particle diameter of amorphous silica particle SEAHOSTAR KE-P30 manufactured by Nippon Shokubai Co., Ltd., average particle diameter: 0.20

MX-200W: Polymethyl methacrylate-based crosslinking substance particles EPOSTAR MA manufactured by Nippon Shokubai Co., Ltd., average particle diameter: 0.35 μm DISPERBYK166: Particle dispersing agent, 30% by mass solution of butyl acetates/methoxypropyl acetate)

BYK-P104: Particle dispersing agent, 50% solution of xylene/diisobutyl ketone (manufactured by BYK Japan KK)

MEGAFAC F-784-F: Antifouling agent of fluorine-containing compound manufactured by DIC Corporation (Polymerizable group-free)

FP-1: Polymerizable resin III-1 of Synthesization Example 1 disclosed in JP2013-156332A FP-2: Radical polymerizable resin Y-1 of Example 1 disclosed in WO2009/133770A X-22-164AS: Silicone compound reactive at both ends manufactured by Shin-Etsu Chemical Co., Ltd. (molecular weight: 900, polydimethyl siloxane unit: less than 1,000)

X-22-164C: Silicone compound reactive at both ends manufactured by Shin-Etsu Chemical Co., Ltd. (molecular weight: 4,740, polydimethyl siloxane unit: 1,000 or more)

minutes at 120° C., nitrogen purge was performed so as to be an atmosphere in which an oxygen concentration was 0.1% by volume or less, the coated layer was cured by ultraviolet irradiation with an illuminance of 600 mW/cm$^2$ and an irradiation amount of 600 mJ/cm$^2$ by using an air cooling metal halide lamp of 240 W/cm (manufactured by Eye Graphics Co., Ltd.), and the antireflective layer and the infiltration layer were formed, such that an antireflective film sample No. 1A was manufactured. In addition, the film thickness was set to be a thickness that became 5 μm, when glass was coated and curing was performed in the same manner.

In the same manner, antireflective film sample Nos. 2A to 20A were manufactured by using the compositions for forming the antireflective layer A-2 to A-20.

(Manufacturing (Meth)Acryl-Based Resin Film-1)

Pellets of [mixture of 90 parts by mass of a (meth)acryl-based resin having a lactone ring structure expressed by Formula (1A) {copolymerization monomer mass ratio=methyl methacrylate/methyl 2-(hydroxymethyl)acrylate=8/2, lactone ring formation rate: about 100%, content ratio of lactone ring structure: 19.4%, weight average molecular weight: 133,000, melt flow rate: 6.5 g/10 minutes (240° C., 10 kgf), Tg 131° C.} and 10 parts by mass of an acrylonitrile-styrene (AS) resin {TOYO ASAS20, manufactured by Toyo Styrene Co., Ltd.}; Tg 127° C.] were supplied to a biaxial extruder and were melted and extruded at about 280° C. to a sheet shape, such that a (meth)acryl-based resin sheet having a lactone ring structure with a thickness of 110 μm was obtained. This unstretched sheet was stretched

TABLE 1

Composition for forming antireflective layer

| Liquid No. | Monomer | Particles | | Irg. 184 | Dispersing agent | | Solvent | Solid content concentration |
|---|---|---|---|---|---|---|---|---|
| A-1 | PETA | KE-P30 | 1% | 3% | — | | Butyl acetate | 50% |
| A-2 | PETA | KE-P30 | 10% | 3% | — | | Butyl acetate | 50% |
| A-3 | HEMA | KE-P30 | 10% | 3% | — | | Butyl acetate | 50% |
| A-4 | TMPTA | KE-P30 | 10% | 3% | — | | Butyl acetate | 50% |
| A-5 | BLEMMER GLM | KE-P30 | 10% | 3% | — | | Butyl acetate | 50% |
| A-6 | PETA | Dispersion liquid B-1 | 10% | 3% | — | | Butyl acetate | 50% |
| A-7 | PETA | KE-P10 | 10% | 3% | — | | Butyl acetate | 50% |
| A-8 | PETA | KE-P50 | 10% | 3% | — | | Butyl acetate | 50% |
| A-9 | PETA | MX-200W | 10% | 3% | — | | Butyl acetate | 50% |
| A-10 | PETA | KE-P30 | 10% | 3% | DISPERBYK166 | 0.2% | Butyl acetate | 50% |
| A-11 | PETA | KE-P30 | 10% | 3% | BYK-P104 | 0.2% | Butyl acetate | 50% |
| A-12 | PETA | KE-P30 | 10% | 3% | — | | MiBK | 50% |
| A-13 | PETA | KE-P30 | 7% | 3% | — | | Acetone | 50% |
| A-14 | PETA | KE-P30 | 7% | 3% | — | | Methyl acetate | 50% |
| A-15 | PETA | KE-P30 | 25% | 3% | — | | Butyl acetate | 50% |
| A-16 | PETA | KE-P30 | 10% | 3% | — | | Butyl acetate | 50% |
| A-17 | HEMA | KE-P30 | 10% | 3% | — | | Butyl acetate/ MiBK = 50/50 | 50% |
| A-18 | PETA | KE-P30 | 10% | 3% | — | | Butyl acetate | 50% |
| A-19 | PETA | KE-P30 | 10% | 3% | DISPERBYK166 | 0.2% | Butyl acetate | 50% |
| A-20 | PETA | KE-P30 | 55% | 3% | — | | Butyl acetate | 50% |

(Manufacturing Antireflective Film)

A cellulose triacetate film (TG40UL, manufactured by Fujifilm Holdings Corporation) as a substrate was coated with the composition for forming the antireflective layer A-1 by using a gravure coater. After drying was performed for 5 vertically 2.0 times and horizontally 2.4 times, under the temperature condition of 160° C., such that a (meth)acryl-based resin film-1 (thickness: 40 μm, in-plane phase difference And: 0.8 nm, thickness direction phase difference Rth (550 nm): 1.5 nm) was obtained.

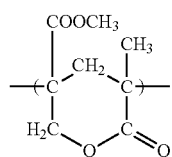
(1A)

(Corona Discharge Treatment)

A corona discharge treatment (corona discharge electron irradiation amount: 77 W/m²/min) was performed on one side of the (meth)acryl-based resin film obtained as described above.

(Evaluating Antireflective Film)

Evaluations of the entirety of characteristics of the antireflective film were performed by the methods below. Results are presented in Table 2.

(Confirmation of Moth-Eye Structure)

With respect to the surface of the antireflective film, a shape was observed with a scanning electron microscope, and the surface shape was evaluated. A period of a microstructured pattern was obtained by drawing a straight line randomly from a corner to a corner on a scanning electron micrograph, using an average value by measuring a distance n=50 between the highest points of adjacent convex portions on the straight line, and rounding off a numerical value to the first digit (less than 10 nm). If a convex portion was not able to be observed, it was considered to have "no cycle".

A . . . The surface had a shape formed with curved-shaped convex portions, and a moth-eye structure was clearly made.

B . . . A moth-eye structure close to A was made, but it was difficult to distinguish whether convex portions were clearly present.

C . . . Other shapes that did not have convex portions (No period)

(Confirming Infiltration Layer)

Cross sections of a sample cut to squares of about 3 mm were made to be thin by a microtome and electropolishing until slices in the thickness of 10 nm were manufactured, and the sample was observed with a transmission electron microscope (TEM) to find whether there was a infiltration layer.

(Integrated Reflectance)

In a state in which back surface reflection was lost by roughening a back surface of the film by sandpaper and then treating the back surface with black ink, an adapter ARV-474 was mounted on a spectrophotometer V-550 (manufactured by JASCO Corporation), integrated reflectance at an angle of incidence of 5° in an area having a wavelength in the range of 380 nm to 780 nm was measured, and average reflectance was calculated, such that antireflective properties were evaluated.

(Uniformity of Surface)

The uniformity of the surface was evaluated by a haze value. If the particles aggregated with each other and the surface were uneven, haze became high. In conformity with JIS-K7136, the entirety of haze values (%) of the obtained films were measured. In the apparatus, a haze meter NDH4000 manufactured by Nippon Denshoku Industries Co., Ltd. was used.

A case where a haze value was 2% or less . . . . Uniformity of the surface was excellent.

A case where a haze value was greater than 2% and 5% or less . . . . There was slight unevenness in a surface shape, but there was no problem in external appearance.

A case where a haze value was greater than 5% . . . . There was unevenness in a surface shape and thus external appearance was harmed.

TABLE 2

| | | Evaluation | | | | | | |
|---|---|---|---|---|---|---|---|---|
| | | Film thickness | | Surface shape | | | Haze | |
| Sample No. | Substrate | Antireflective layer | Infiltration layer | Moth-eye structure | Cycle of convex portion [nm] | Integrated reflectance | value (%) | |
| No. 1A | TAC | 0.5 μm | 5 μm | C | 1100 | 4.1% | 0.3 | Comparative Example |
| No. 2A | TAC | 1 μm | 4 μm | A | 320 | 1.2% | 1.0 | Example |
| No. 3A | TAC | 0.7 μm | 4.5 μm | A | 310 | 1.2% | 1.0 | Example |
| No. 4A | TAC | 2.5 μm | 2.5 μm | B | 330 | 1.5% | 1.0 | Example |
| No. 5A | TAC | 3 μm | 2 μm | B | 330 | 2.0% | 1.0 | Example |
| No. 6A | TAC | 1 μm | 4 μm | A | 320 | 0.8% | 1.0 | Example |
| No. 7A | TAC | 1 μm | 4 μm | A | 200 | 2.2% | 1.0 | Example |
| No. 8A | TAC | 1 μm | 4 μm | A | 570 | 1.7% | 1.0 | Example |
| No. 9A | TAC | 1 μm | 4 μm | A | 370 | 1.0% | 1.0 | Example |
| No. 10A | TAC | 1 μm | 4 μm | A | 320 | 0.8% | 0.3 | Example |
| No. 11A | TAC | 1 μm | 4 μm | A | 300 | 0.8% | 0.5 | Example |
| No. 12A | TAC | 5 μm | 0 μm | C | No cycle | 4.0% | 0.5 | Comparative Example |
| No. 13A | TAC | 0.8 μm | 4.5 μm | A | 310 | 1.0% | 1.4 | Example |
| No. 14A | TAC | 0.8 μm | 4.5 μm | A | 310 | 1.0% | 1.2 | Example |
| No. 15A | TAC | 2 μm | 3 μm | B | 400 | 2.2% | 3.0 | Example |
| No. 16A | Acryl | 1 μm | 4 μm | A | 320 | 1.2% | 1.0 | Example |
| No. 17A | Acryl | 1 μm | 4 μm | A | 320 | 1.2% | 1.2 | Example |
| No. 18A | Glass | 5 μm | 0 μm | C | No cycle | 4.0% | 0.5 | Comparative Example |
| No. 19A | Glass | 5 μm | 0 μm | C | No cycle | 4.0% | 0.3 | Comparative Example |
| No. 20A | TAC | 3 μm | 2 μm | C | 2000 | 1.5% | 35.0 | Comparative Example |

In Table 2, "TAC" represents a cellulose triacetate film substrate, "Acryl" represents the (meth)acryl-based resin film-1, and "glass" represents a glass substrate called S9111 manufactured by Matsunami Glass Ind., Ltd.

Figure 2:
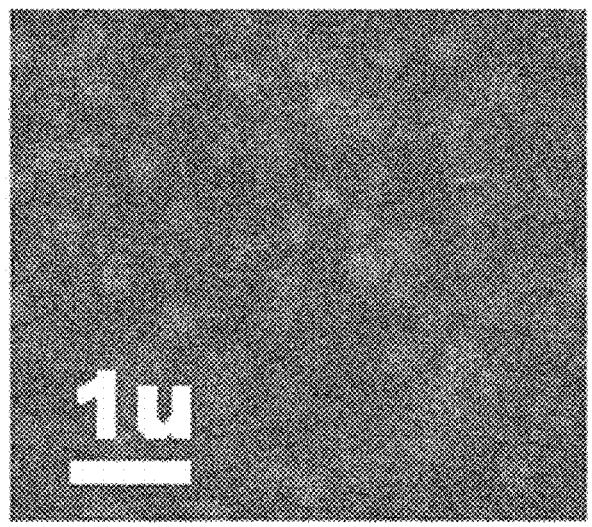
FIG. 2 is a diagram illustrating a picture illustrating a SEM image of a sample No. 12A, which is a comparative example.

As presented in Table 2, in the samples according to the invention in which moth-eye structures and infiltration layers are formed together, low reflection properties in which uniformity of the surfaces was excellent (haze was low) and integrated reflectance was excellent were exhibited (for example, Example Sample No. 2A and Comparative Example Sample No. 18A). In Comparative Example Sample No. 19A, it was found that an infiltration layer was not formed, but integrated reflectance was not improved only by causing the surface shape to be even due to the addition of the dispersing agent. SEM pictures of Example Sample No. 2A and Comparative Example Sample No. 12A were respectively presented in FIGS. 1 and 2. Unevenness of particles in the example sample was clearly seen, but in the comparative example sample, an infiltration layer was not formed, and a state in which particles were buried in the binder was known.

Example 2

[Manufacturing Plastic Substrate with Hard Coat Layer]

As described below, a composition for forming a hard coat layer was prepared, a transparent substrate was coated with the composition, and a plastic substrate with the hard coat layer was manufactured.

(Preparing Composition for Forming Hard Coat Layer)

10.5 parts by mass of methyl acetate, 10.5 parts by mass of MEK, 22.52 parts by mass of PET30, 6.30 parts by mass of an urethane monomer, and 0.84 parts by mass of IRGA-CURE184 were put into a mixing tank, stirred, and filtered with a polypropylene filter having a pore size of 0.4 μm such that a hard coat layer coating liquid B-1 (solid content concentration: 58% by mass) was obtained.

The urethane monomer used is a compound having a structure presented below.

(Manufacturing Plastic Substrate with Hard Coat Layer)

A cellulose triacetate film (TG40UL, manufactured by Fujifilm Holdings Corporation) was coated with the hard coat layer coating liquid B-1 using a gravure coater (solid content coating amount: 12.1 g/m$^2$). After drying was performed at 100° C., nitrogen purge was performed so as to be an atmosphere in which an oxygen concentration was 0.1% by volume or less, the coated layer was cured by ultraviolet irradiation with an illuminance of 400 mW/cm$^2$ and an irradiation amount of 150 mJ/cm$^2$ by using an air cooling metal halide lamp of 160 W/cm (manufactured by Eye Graphics Co., Ltd.), and the hard coat layer was formed, such that the plastic substrate with the hard coat layer was manufactured.

[Manufacturing Antireflective Film]

(Preparing Composition for Forming Antireflective Layer)

In the same method as in the composition for forming the antireflective layer A-1 of Example 1, respective components were adjusted to have composition ratios (on a mass basis) presented in Table 3 below, such that compositions for forming the antireflective layers B-1 and B-2 having the solid content concentration of 50% by mass were manufactured.

TABLE 3

| | Composition for forming antireflective layer | | | | | |
|---|---|---|---|---|---|---|
| Liquid No. | Solid content | | | | | Solid content concentration |
| | Monomer | Particles | | Irg. 184 | Dispersing agent | Solvent | |
| B-1 | PETA/HEMA = 30/70 | KE-P30 | 10% | 3% | DISPERBYK 166 0.2% | Butyl Acetate | 50% |
| B-2 | PETA/HEMA = 30/70 | MX-200W | 10% | 3% | DISPERBYK 166 0.2% | Butyl Acetate | 50% |

(Preparing Antireflective Film)

Except that the plastic substrate with the hard coat layer was used instead of the cellulose triacetate film, as a substrate, in the same method as in the antireflective film No. 1A of Example 1, compositions for forming the antireflective layers B-1 and B-2 were used, such that the antireflective film sample Nos. 1B and 2B were manufactured.

(Evaluating Antireflective Film)

Evaluations of the entirety of characteristics of the antireflective film were performed by the methods below. Results are presented in Table 4.

(Pencil Hardness)

A pencil hardness evaluation disclosed in JIS K5400 was performed. The respective film samples were put for 2 hours

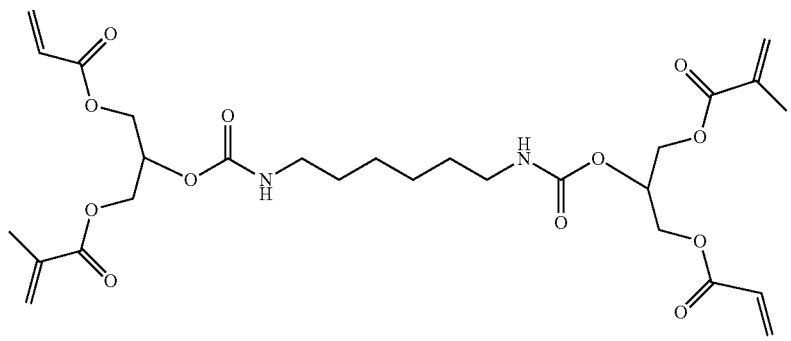 [SMILES: C=CC(=O)OCC(COC(=O)C(=C)C)OC(=O)NCCCCCCNC(=O)OC(COC(=O)C=C)COC(=O)C(=C)C]

at a temperature of 25° C. and a humidity of 60% RH, and evaluated by the following criteria by using a test pencil regulated in JIS 56006.

A: 2H or more
B: H or more and less than 2H
C: less than H

TABLE 4

| | | Evaluation | | | | | |
|---|---|---|---|---|---|---|---|
| | | Surface shape | | | | | |
| Sample No. | Substrate | Moth-eye structure | Cycle of convex portion [nm] | Integrated reflectance | Haze | Pencil hardness | |
| No. 1B | Hard coat | A | 330 | 0.8% | 1.0 | A | Example |
| No. 2B | Hard coat | A | 380 | 0.8% | 0.8 | A | Example |

As presented in Table 4, even if the plastic substrate with the hard coat layer was used as a substrate, it was possible to manufacture samples in which a haze was low and antireflective properties were excellent. Further, it was confirmed that these samples were also excellent in pencil hardness.

Example 3

(Manufacturing Cleaning Cloth A)
Polyethylene terephthalate (PET) having an intrinsic viscosity of 0.71 was used as an island component, PET obtained by copolymerizing 7.3% by mass of 5-sodium sulfoisophthalic acid having an intrinsic viscosity of 0.55 was used as a sea component, a sea-island structural composite spinneret in which the number of islands is 127 and the number of holes is 112 was used, and melt spinning was performed under the conditions of an island component ratio of 30% by mass, a spinning temperature of 290° C., and a winding speed of 1,500 m/min, such that an unstretched yarn was obtained. Subsequently, the obtained unstretched yarn was stretched under the conditions of a winding speed of 500 m/min, a preheating temperature of 90° C., and a heat set temperature of 160° C., such that a sea-island structural composite fiber (fiber 1) of a 44 dtex-112 filament was obtained.

Meanwhile, except that the island component was made of polypropylene terephthalate (PPT) having an intrinsic viscosity of 1.14, melt spinning was performed in the same manner as in the fiber 1. The obtained unstretched yarn was stretched under the conditions of a winding speed of 500 m/min, a stretching temperature of 90° C., and a heat set temperature of 100° C., such that a sea-island structural composite fiber of a 75 dtex-112 filament (fiber 2) was obtained. The time difference of removing the sea components between the obtained fibers 1 and 2 was 4%.

The obtained fibers 1 and 2 were blended by interlacing, and then were immersed in 2% by mass of an aqueous solution of sodium hydroxide at a temperature of 80° C., such that sea components were melted and removed, and temporary shrinkage treatment was performed. Subsequently, the obtained fibers 1 and 2 were immersed in boiling water at a temperature of 98° C. and dried such that shrinkage was completed. With respect to the obtained nanofiber blended yarn, the fiber diameter of the fiber 1 was 280 nm, the fiber diameter of the fiber 2 was 290 nm, the difference in yarn lengths was 10%, and the extension strength ratio at the time of 20% extension was 85%. The obtained nanofiber blended yarn was extremely excellent in the dispersibility of the short fibers, a fabric formed with the obtained nanofiber blended yarn was excellent in wiping property and scratching properties, and thus had sufficient properties to be used as a product.

With respect to the fabric formed with the obtained nanofiber blended yarn, a corona discharge treatment (corona discharge electron irradiation amount: 34 W/m²/min) was performed such that a cleaning cloth A was manufactured. The opening of the obtained cleaning cloth A was 290 nm, and the water contact angle was 30°.

(Manufacturing of Cleaning Cloth B)
With respect to the nanofiber blended yarn that was able to be manufactured in the same manner as in the cleaning cloth A except for setting the island component ratio to be 15% by mass, the fiber diameter of the fiber 1 was 140 nm, and the fiber diameter of the fiber 2 was 145 nm. With respect to the fabric formed with the nanofiber blended yarn, an opening of a cleaning cloth B after the corona discharge treatment was 145 nm, and the water contact angle was 20°.

(Manufacturing Cleaning Cloth C)
With respect to the nanofiber blended yarn that was able to be manufactured in the same manner as in the cleaning cloth A except that the island component ratio was 45% by mass, the fiber diameter of the fiber 1 was 430 nm, and the fiber diameter of the fiber 2 was 440 nm. With respect to the fabric formed with the nanofiber blended yarn, the opening of the cleaning cloth C after the corona discharge treatment was 440 nm and the water contact angle was 40°.

[Manufacturing Antireflective Film]
(Preparing Composition for Forming Antireflective Layer)
In the same method as in the composition for forming the antireflective layer A-1 of Example 1, respective components were adjusted in the composition ratio (on a mass basis) presented in Table 5 such that compositions for forming the antireflective layers C-1 to C-31 having the solid content concentration of 50% by mass were manufactured.

In the same method as in the antireflective film No. 1A of Example 1, except that the compositions for forming the antireflective layers C-1 to C-31 were used instead of the composition for forming the antireflective layer A-1, the antireflective film sample Nos. 1C to 31C were manufactured.

(Antifouling Property Evaluation 1)
The substrate side of the antireflective film was fixed on a glass surface with an pressures-sensitive adhesives, three circle shapes having a diameter of 5 mm were drawn with a pen tip (fine point) of an oil marker (ink color: black) "MACKEE ULTRAFINE (Product name: manufactured by Zebra Co., Ltd.)" on the surface of the antireflective layer under the conditions of 25° C. and 60 RH %, and, after 10 seconds, three circle shapes were wiped by reciprocating twice under a load in which a bundle of bemcots was collapsed, with the cleaning cloths A to C, of which 10 sheets were overlapped, folded and bundled, and SAVINA (manufactured by KB Seiren, Ltd., opening: 1 μm).
A . . . A marker trace was not recognizable.
B . . . A marker trace was slightly recognizable.
C . . . A marker trace was spread and recognizable.
D . . . A marker trace was not wiped away.
(Antifouling Property Evaluation 2)
The antireflective film having the moth-eye structure according to the invention was fixed on a glass surface with an pressures-sensitive adhesives such that the antireflective layer side became the most front surface, fingerprints were attached on the surface of the antireflective layer under the conditions of 25° C. and 60 RH %, and, after 10 seconds, the fingerprints were wiped by reciprocating twice under a load in which a bundle of bemcots was collapsed, with the cleaning cloths A to C, of which 10 sheets were overlapped, folded and bundled, and SAVINA (manufactured by KB Seiren, Ltd., opening: 1 μm), and antifouling properties were evaluated by the observation circumstances of fingerprint traces.
A . . . A fingerprint trace was not recognizable.
B . . . A fingerprint trace was slightly recognizable.
C . . . A fingerprint trace was spread and recognizable.
D . . . A fingerprint trace was not wiped away.

TABLE 5

Composition for forming antireflective layer

| Liquid No. | Monomer | Particles | | Initiator | | Leveling agent | | Solvent | Solid content concentration |
|---|---|---|---|---|---|---|---|---|---|
| C-1 | PETA | KE-P30 | 10% | Irg. 184 | 3% | — | — | Acetone | 50% |
| C-2 | PETA | KE-P30 | 10% | Irg. 184 | 3% | F-784-F | 0.2% | Acetone | 50% |
| C-3 | PETA | KE-P30 | 10% | Irg. 907 | 3% | F-784-F | 0.2% | Acetone | 50% |
| C-4 | PETA | KE-P30 | 10% | Irg. 127 | 3% | F-784-F | 0.2% | Acetone | 50% |
| C-5 | PETA/HEMA = 30/70 | KE-P30 | 10% | Irg. 127 | 3% | F-784-F | 0.2% | Acetone | 50% |
| C-6 | PETA/HEMA = 70/30 | KE-P30 | 10% | Irg. 127 | 3% | F-784-F | 0.2% | Acetone | 50% |
| C-7 | PETA/HEMA = 70/30 | Particles A | 10% | Irg. 127 | 3% | F-784-F | 0.2% | Acetone | 50% |
| C-8 | PETA/HEMA = 70/30 | KE-P30 | 10% | Irg. 127 | 3% | F-784-F | 0.2% | Acetone | 50% |
| C-9 | PETA/HEMA = 70/30 | Particles A | 10% | Irg. 127 | 3% | F-784-F | 0.2% | Acetone | 50% |
| C-10 | PETA/HEMA = 70/30 | KE-P30 | 10% | Irg. 127 | 3% | FP-1 | 0.5% | Acetone | 50% |
| C-11 | PETA/HEMA = 70/30 | Particles A | 10% | Irg. 127 | 3% | FP-1 | 0.5% | Acetone | 50% |
| C-12 | PETA/HEMA = 70/30 | Particles B | 10% | Irg. 127 | 3% | FP-2 | 1.5% | Acetone | 50% |
| C-13 | PETA/HEMA = 70/30 | KE-P50 | 10% | Irg. 127 | 3% | FP-2 | 1.5% | Acetone | 50% |
| C-14 | PETA/HEMA = 70/30 | KE-P30 | 10% | Irg. 127 | 3% | FP-2 | 1.5% | Acetone | 50% |
| C-15 | PETA/HEMA = 70/30 | KE-P30 | 10% | Irg. 127 | 3% | FP-2 | 1.5% | Acetone | 50% |
| C-16 | PETA/HEMA = 70/30 | KE-P30 | 10% | Irg. 127 | 3% | FP-2 | 1.5% | Acetone | 50% |
| C-17 | PETA/HEMA = 70/30 | Particles A | 10% | Irg. 127 | 3% | FP-2 | 1.5% | Acetone | 50% |
| C-18 | PETA/HEMA = 70/30 | Particles A | 10% | Irg. 127 | 3% | FP-2 | 1.5% | Acetone | 50% |
| C-19 | PETA/HEMA = 70/30 | KE-P10 | 10% | Irg. 127 | 3% | FP-2 | 1.5% | Acetone | 50% |
| C-20 | PETA/HEMA = 70/30 | Particles C | 10% | Irg. 127 | 3% | FP-2 | 1.5% | Acetone | 50% |
| C-21 | PETA/HEMA = 70/30 | KE-P30 | 10% | Irg. 127 | 3% | X-22-164AS | 2.0% | Acetone | 50% |
| C-22 | PETA/HEMA = 70/30 | Particles A | 10% | Irg. 127 | 3% | X-22-164AS | 2.0% | Acetone | 50% |
| C-23 | PETA/HEMA = 70/30 | KE-P30 | 10% | Irg. 127 | 3% | X-22-164C | 1.5% | Acetone | 50% |
| C-24 | PETA/HEMA = 70/30 | Particles A | 10% | Irg. 127 | 3% | X-22-164C | 1.5% | Acetone | 50% |
| C-25 | PETA/HEMA = 70/30 | KE-P30 | 10% | Irg. 127 | 3% | KPN-3504 | 1.5% | Acetone | 50% |
| C-26 | PETA/HEMA = 70/30 | Particles A | 10% | Irg. 127 | 3% | KPN-3504 | 1.5% | Acetone | 50% |
| C-27 | PETA/HEMA = 70/30 | Particles D | 10% | Irg. 127 | 3% | KPN-3504 | 0.8% | Acetone | 50% |
| C-28 | PETA/HEMA = 70/30 | Particles E | 10% | Irg. 127 | 3% | KPN-3504 | 0.8% | Acetone | 50% |
| C-29 | PETA/HEMA = 70/30 | Particles F | 10% | Irg. 127 | 3% | FP-2 | 0.8% | Acetone | 50% |
| C-30 | PETA/HEMA = 70/30 | Particles G | 10% | Irg. 127 | 3% | FP-2 | 0.8% | Acetone | 50% |
| C-31 | PETA/HEMA = 70/30 | Particles B | 10% | Irg. 127 | 3% | — | — | Acetone | 50% |

TABLE 6

Evaluation

| Sample No. | Sub-strate | Film thickness | | Surface shape | | Integrated reflectance | Haze | Contact angle | | Antifouling properties | | | |
|---|---|---|---|---|---|---|---|---|---|---|---|---|---|
| | | Antire-flective layer | Infil-tration layer | Moth-eye structure | Cycle of convex portion [nm] | | | Pure water | Oleic acid | Cleaning cloth | Oil marker | Finger print | |
| No. 1C | TAC | 0.8 μm | 4.5 μm | A | 310 | 1.0% | 1.4 | 20 | 1 | A | D | D | Example |
| No. 2C | TAC | 0.8 μm | 4.5 μm | A | 320 | 1.0% | 2.0 | 103 | 76 | A | B | C | Example |
| No. 3C | TAC | 0.8 μm | 4.5 μm | A | 305 | 1.0% | 1.9 | 104 | 78 | A | B | C | Example |
| No. 4C | TAC | 0.8 μm | 4.5 μm | A | 310 | 1.0% | 2.1 | 104 | 78 | A | B | C | Example |
| No. 5C | TAC | 0.8 μm | 6.0 μm | A | 320 | 1.0% | 2.0 | 103 | 76 | A | B | C | Example |
| No. 6C | TAC | 0.3 μm | 1.2 μm | A | 305 | 1.0% | 1.8 | 104 | 78 | A | B | C | Example |
| No. 7C | TAC | 0.2 μm | 0.8 μm | A | 210 | 1.2% | 1.5 | 103 | 76 | A | B | C | Example |
| No. 8C | TAC | 0.3 μm | 1.2 μm | A | 310 | 1.0% | 1.9 | 104 | 76 | A | B | C | Example |
| No. 9C | TAC | 0.2 μm | 0.8 μm | A | 210 | 1.2% | 1.6 | 106 | 79 | B | B | C | Example |
| No. 10C | TAC | 0.3 μm | 1.2 μm | A | 305 | 1.0% | 1.7 | 100 | 75 | A | B | C | Example |
| No. 11C | TAC | 0.2 μm | 0.8 μm | A | 205 | 1.2% | 1.3 | 101 | 76 | B | B | C | Example |

TABLE 6-continued

| | | Evaluation | | | | | | | | | | | |
|---|---|---|---|---|---|---|---|---|---|---|---|---|---|
| | | Film thickness | | Surface shape | | | | Contact angle | | Antifouling properties | | | |
| Sample No. | Sub-strate | Antireflective layer | Infiltration layer | Moth-eye structure | Cycle of convex portion [nm] | Integrated reflectance | Haze | Pure water | Oleic acid | Cleaning cloth | Oil marker | Finger print | |
| No. 12C | TAC | 0.7 μm | 2.5 μm | A | 710 | 2.0% | 5.0 | 126 | 101 | A | A | A | Example |
| No. 13C | TAC | 0.5 μm | 1.8 μm | A | 510 | 1.7% | 3.0 | 128 | 103 | A | A | A | Example |
| No. 14C | TAC | 0.3 μm | 1.2 μm | A | 305 | 1.0% | 1.6 | 130 | 105 | C | B | B | Example |
| No. 15C | TAC | 0.3 μm | 1.2 μm | A | 310 | 1.0% | 1.7 | 130 | 105 | A | A | A | Example |
| No. 16C | TAC | 0.3 μm | 1.2 μm | A | 320 | 1.0% | 1.5 | 130 | 105 | B | A | A | Example |
| No. 17C | TAC | 0.2 μm | 0.8 μm | A | 205 | 1.1% | 0.9 | 133 | 108 | A | B | B | Example |
| No. 18C | TAC | 0.2 μm | 0.8 μm | A | 210 | 1.1% | 0.9 | 130 | 105 | B | A | A | Example |
| No. 19C | TAC | 0.1 μm | 0.4 μm | A | 110 | 1.5% | 0.7 | 134 | 109 | B | B | B | Example |
| No. 20C | TAC | 0.05 μm | 0.3 μm | A | 60 | 2.0% | 0.5 | 135 | 109 | B | C | B | Example |
| No. 21C | TAC | 0.3 μm | 1.2 μm | A | 310 | 1.0% | 1.7 | 100 | 75 | B | B | C | Example |
| No. 22C | TAC | 0.2 μm | 0.8 μm | A | 205 | 1.2% | 1.3 | 101 | 76 | A | B | C | Example |
| No. 23C | TAC | 0.3 μm | 1.2 μm | A | 310 | 1.0% | 1.8 | 120 | 78 | B | A | C | Example |
| No. 24C | TAC | 0.2 μm | 0.8 μm | A | 210 | 1.2% | 1.4 | 122 | 80 | A | A | B | Example |
| No. 25C | TAC | 0.3 μm | 1.2 μm | A | 310 | 1.0% | 1.7 | 124 | 82 | B | A | B | Example |
| No. 26C | TAC | 0.2 μm | 0.8 μm | A | 210 | 1.1% | 1.5 | 126 | 84 | A | A | B | Example |
| No. 27C | TAC | 0.3 μm | 1.2 μm | A | 340 | 1.0% | 1.9 | 127 | 86 | B | A | A | Example |
| No. 28C | TAC | 0.2 μm | 0.8 μm | A | 240 | 1.2% | 1.7 | 127 | 87 | A | A | B | Example |
| No. 29C | TAC | 0.3 μm | 1.2 μm | A | 340 | 1.0% | 1.6 | 135 | 110 | B | A | A | Example |
| No. 30C | TAC | 0.2 μm | 0.8 μm | A | 240 | 1.1% | 1.2 | 138 | 113 | A | A | A | Example |
| No. 31C | TAC | 0.7 μm | 2.4 μm | A | 710 | 2.0% | 3.0 | 40 | 3 | SAVINA | D | D | Example |

As presented in Table 6, a contact angle of the antireflective film having the moth-eye structure was able to be increased by adding the antifouling agent, and thus the adhesiveness of dirt was able to be remarkably improved. In addition, in a cleaning method obtained by combining the cleaning cloth and the antireflective film having the moth-eye structure, dirt removing properties were able to be increased.

INDUSTRIAL APPLICABILITY

According to the invention, it is possible to provide a antireflective film having a moth-eye structure which has sufficient antireflective performances, exhibits excellent planar uniformity, and can be manufactured by a simple method. In addition, according to the invention, it is possible to provide a polarizing plate, a cover glass, and an image display device which include the antireflective film.

Further, according to the invention, it is possible to provide the antireflective film having the moth-eye structure and also having antifouling properties, and thus it is possible to provide a polarizing plate, a cover glass, and an image display device, which have moth-eye structures, to which reflection prevention and antifouling properties are provided, which are practical, and which have satisfactory visibility, by using the antireflective film.

In addition, with respect to a kit including the antireflective film and a cleaning cloth according to the invention, it is possible to easily remove dirt of the antireflective film having the moth-eye structure by cleaning the antireflective film with the cleaning cloth.

The invention is described with reference to the specific embodiments, but it is clear to a person having ordinary skill in the art that various changes and modifications can be added without departing from the spirit and the scope of the invention.

What is claimed is:

1. An antireflective film comprising:
   a plastic substrate;
   a permeable layer; and
   an antireflective layer, which includes a binder resin and particles with an average primary particle diameter in the range of 50 nm to 700 nm,
   wherein the plastic substrate, the infiltration layer, and the antireflective layer are adjacent to each other in this order, and
   the antireflective layer has a moth-eye structure formed by the particles on a surface opposite to the infiltration layer.

2. The antireflective film according to claim 1,
   wherein integrated reflectance over an entire range of wavelengths from 380 nm to 780 nm is 3% or less.

3. The antireflective film according to claim 1,
   wherein the binder resin includes a resin that is produced by curing a compound having a (meth)acryloyl group with a molecular weight of 150 to 1,600.

4. The antireflective film according to claim 1,
   wherein the binder resin includes a resin produced by curing a compound having a (meth)acryloyl group and having a SP value in a range of 20 to 25.

5. The antireflective film according to claim 1,
   wherein the particles are metal oxide particles.

6. The antireflective film according to claim 1,
   wherein the particles are silica particles.

7. The antireflective film according to claim 1,
   wherein the particles are particles subjected to a surface treatment with a compound having an unsaturated double bond.

8. The antireflective film according to claim 1,
   wherein the antireflective layer has a film thickness of 0.1 μm to 5 μm.

9. The antireflective film according to claim 1,
   wherein the infiltration layer has a film thickness of 0.1 μm to 5 μm.

10. The antireflective film according to claim 1,
    wherein the antireflective layer contains a dispersing agent.

11. The antireflective film according to claim 1,
wherein the infiltration layer contains a solvent having infiltration property with respect to the plastic substrate.

12. The antireflective film according to claim 1,
wherein the plastic substrate contains cellulose acylate.

13. The antireflective film according to claim 1,
wherein a haze value is 5% or less.

14. The antireflective film according to claim 1,
wherein a contact angle of water is 100° or more.

15. The antireflective film according to claim 1,
wherein the antireflective layer contains a fluorine-containing compound or a silicone compound in a range of 2% by mass or less with respect to an entire amount of the antireflective layer.

16. The antireflective film according to claim 15,
wherein the fluorine-containing compound or the silicone compound has a polymerizable group in a molecule.

17. The antireflective film according to claim 15,
wherein the fluorine-containing compound has a polyether unit in a molecule.

18. The antireflective film according to claim 15,
wherein the silicone compound has a polydimethyl siloxane unit with a molecular weight of 1,000 or more.

19. The antireflective film according to claim 15, further comprising:
the fluorine-containing compound or the silicone compound,
wherein a contact angle of water is 110° or more, and
a contact angle of an oleic acid is 80° or more.

20. The antireflective film according to claim 1, further comprising:
only monodispersed silica particles with an average primary particle diameter of the particles in the range of 50 nm to 200 nm, and a Cv value of less than 5%.

21. A polarizing plate comprising:
the antireflective film according to claim 1 as a polarizing plate protective film.

22. A cover glass comprising:
the antireflective film according to claim 1 as a protective film.

23. An image display device comprising:
the antireflective film according to claim 1.

24. A method for producing a antireflective film that includes a plastic substrate, a infiltration layer, and an antireflective layer, which includes a binder resin, and particles with an average primary particle diameter in the range of 50 nm to 700 nm, in which the plastic substrate, the infiltration layer, and the antireflective layer are adjacent to each other in this sequence, and the antireflective layer has a moth-eye structure formed by the particles on a surface opposite to the infiltration layer, the method comprising:
coating the plastic substrate with a composition, which includes particles with an average primary particle diameter in the range of 50 nm to 700 nm, a polymerizable compound for forming a binder resin, and a solvent having infiltration property into the plastic substrate;
infiltrating, in the plastic substrate, the solvent having infiltration property into the plastic substrate and a portion of the polymerizable compound for forming the binder resin;
curing the polymerizable compound for forming the binder resin by ionization radiation irradiation or heating after an organic solvent is dried; and
forming the infiltration layer and the antireflective layer having the moth-eye structure formed by the particles on the surface opposite to the infiltration layer.

25. A cleaning cloth for removing dirt attached to the antireflective film according to claim 1,
wherein hollows or voids with distance smaller than an average primary particle diameter of particles of the antireflective film according to claim 1, and
a contact angle of water is less than 90°.

26. A kit comprising:
the antireflective film according to claim 1; and
a cleaning cloth in which hollows or voids with distance smaller than an average primary particle diameter of the particles of the antireflective film according to claim 1 are formed, and a contact angle of water is less than 90°.

27. A method for cleaning a antireflective film, the method comprising:
removing dirt attached to the antireflective film according to claim 1, by using a cleaning cloth in which hollows or voids with distance smaller than an average primary particle diameter of particles of the antireflective film according to claim 1 are formed, and a contact angle of water is less than 90°.

* * * * *